US009740399B2

(12) United States Patent
Paek et al.

(10) Patent No.: US 9,740,399 B2
(45) Date of Patent: *Aug. 22, 2017

(54) TEXT ENTRY USING SHAPEWRITING ON A TOUCH-SENSITIVE INPUT PANEL

(71) Applicant: Microsoft Technology Licensing, LLC, Redmond, WA (US)

(72) Inventors: Timothy S. Paek, Sammamish, WA (US); Johnson Apacible, Mercer Island, WA (US); Dmytro Rudchenko, Bellevue, WA (US); Bongshin Lee, Issaquah, WA (US); Juan Dai, Redmond, WA (US); Yutaka Suzue, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/745,860

(22) Filed: Jan. 20, 2013

(65) Prior Publication Data
US 2014/0098036 A1   Apr. 10, 2014

Related U.S. Application Data

(60) Provisional application No. 61/712,155, filed on Oct. 10, 2012.

(51) Int. Cl.
*G06F 3/048*   (2013.01)
*G06F 3/041*   (2006.01)
(Continued)

(52) U.S. Cl.
CPC .......... *G06F 3/04886* (2013.01); *G06F 3/023* (2013.01); *G06F 3/0416* (2013.01); *G06F 3/04883* (2013.01)

(58) Field of Classification Search
CPC ........ G06F 3/023–3/027; G06F 3/0416; G06F 3/048; G06F 3/0487–3/04897; G06F 2303/04803
(Continued)

(56) References Cited

U.S. PATENT DOCUMENTS 5,059,048 A   10/1991   Sirkin
5,535,119 A * 7/1996   Ito et al. ........................... 704/3
(Continued)

FOREIGN PATENT DOCUMENTS

CN   102375691 A   3/2012
EP   2079010 A2   7/2009
(Continued)

OTHER PUBLICATIONS

"International Search Report & Written Opinion for PCT Application No. PCT/US2013/064192", Mailed Date: Feb. 17, 2014, Filed Date: Oct. 10, 2013, 8 Pages.
(Continued)

*Primary Examiner* — Nathan Danielsen
(74) *Attorney, Agent, or Firm* — Medley, Behrens & Lewis, LLC

(57) ABSTRACT

Described herein are various technologies pertaining to shapewriting. A touch-sensitive input panel comprises a plurality of keys, where each key in the plurality of keys is representative of a respective plurality of characters. A user can generate a trace over the touch-sensitive input panel, wherein the trace passes over keys desirably selected by the user. A sequence of characters, such as a word, is decoded based upon the trace, and is output to a display or a speaker.

20 Claims, 15 Drawing Sheets

(51) Int. Cl.
*G06F 3/023* (2006.01)
*G06F 3/0488* (2013.01)

(58) Field of Classification Search
USPC .......... 178/18.01–18.11; 345/156, 173–178; 715/863, 864
See application file for complete search history.

(56) References Cited

U.S. PATENT DOCUMENTS

| | | | |
|---|---|---|---|
| 6,873,317 | B1 | 3/2005 | Griffin et al. |
| 7,293,231 | B1 * | 11/2007 | Gunn et al. .................. 345/179 |
| 7,307,620 | B2 | 12/2007 | Siddeeq |
| 7,453,439 | B1 * | 11/2008 | Kushler ................ G06F 3/0237 345/168 |
| 2006/0055669 | A1 | 3/2006 | Das |
| 2008/0297475 | A1 | 12/2008 | Woolf et al. |
| 2008/0316181 | A1 | 12/2008 | Nurmi |
| 2010/0182264 | A1 | 7/2010 | Hahn et al. |
| 2010/0238119 | A1 * | 9/2010 | Dubrovsky et al. ......... 345/169 |
| 2010/0238125 | A1 | 9/2010 | Ronkainen |
| 2010/0241985 | A1 | 9/2010 | Kim et al. |
| 2010/0277414 | A1 | 11/2010 | Tartz et al. |
| 2011/0205160 | A1 | 8/2011 | Song et al. |
| 2011/0234502 | A1 * | 9/2011 | Yun et al. .................... 345/173 |
| 2012/0162078 | A1 | 6/2012 | Ferren et al. |
| 2012/0235942 | A1 | 9/2012 | Shahoian et al. |
| 2012/0249425 | A1 * | 10/2012 | Colley ......................... 345/163 |
| 2013/0057509 | A1 * | 3/2013 | Cruz-Hernandez et al. . 345/174 |

FOREIGN PATENT DOCUMENTS

| | | |
|---|---|---|
| WO | 2011113057 A1 | 9/2011 |
| WO | WO 2011113057 A1 * | 9/2011 |
| WO | 2012155776 A1 | 11/2012 |

OTHER PUBLICATIONS

"ShapeWriter for Mobile Text and Command Input from Ease to Efficiency", Retrieved at http://www.mobileuserexperience.com/mexdesign/shapewritermex.pdf, Sep. 11, 2012, pp. 1-17.

"International Search Report & Written Opinion for PCT Application No. PCT/US2013/063956", Mailed Date: Apr. 11, 2014, Filed Date: Oct. 9, 2013, 15 Pages.

"Office Action for Chinese Patent Application No. 201380053279.3", Mailed Date: Sep. 9, 2016, 16 pages.

"Response to the Office Action for Chinese Patent Application No. 201380053279.3", Filed Date: Jan. 23, 2017, 16 pages.

"Office Action for Chinese Patent Application No. 201380053279.3", dated May 19, 2017, 2017, 6 pages.

* cited by examiner

TEXT ENTRY USING SHAPEWRITING ON A TOUCH-SENSITIVE INPUT PANEL

RELATED APPLICATION

This application claims the benefit of U.S. Provisional Application No. 61/712,155, filed on Oct. 10, 2012, and entitled "ARCED OR SLANTED SOFT INPUT LABELS," the entirety of which is incorporated herein by reference.

BACKGROUND

Mobile computing devices have been configured to display soft keyboards, where a user can enter text by selecting buttons on a soft keyboard. Typically, each key on a soft keyboard represents a single character. Accordingly, for a user to input text, the user can select (e.g., through tapping) discrete keys that are representative of respective characters that are desirably included in such text. As many mobile computing devices have relatively small screens, such computing devices have been configured with software that performs spelling corrections and/or corrects for "fat finger syndrome," where a user mistakenly taps a key that is adjacent to a desirably tapped key.

Conventionally, it is very difficult for a user to accurately enter text utilizing a soft keyboard when the user is not able to continuously look at the screen of the mobile computing device that displays the soft keyboard. This can be at least partially attributed to the relatively small size of the screen, and therefore, the relatively small size of keys includes in the soft keyboard displayed on the screen. For instance, on an exemplary soft keyboard displayed on a mobile telephone, ten separate keys may exist in a single row of keys. Accordingly, it may be difficult for the user to remember which keys are in which rows, and further may be difficult for the user to tap a particular key in the keyboard without looking at the keyboard.

SUMMARY

The following is a brief summary of subject matter that is described in greater detail herein. This summary is not intended to be limiting as to the scope of the claims.

Described herein are various technologies pertaining to utilizing shapewriting on a touch-sensitive input panel to set forth text to a computing device. Shapewriting refers to the selection of characters (represented by keys on the touch-sensitive input panel) through a continuous sequence of strokes, wherein a stroke is a transition from a first key in the touch-sensitive input panel to a second key in the touch-sensitive input panel, and wherein both the first key and the second key are representative of a respective plurality of characters. In the continuous sequence of strokes, the user transitions a digit (e.g., a finger or thumb) over keys in the touch-sensitive input panel while maintaining contact with the touch-sensitive input panel. The keys transitioned over by the digit represent a respective sequence of characters (e.g., a word, acronym, etc.) desirably set forth by a user. Thus, rather than tapping discrete keys on the soft input panel, the user connects keys in a desired sequence, wherein each key is representative of a respective plurality of characters.

In an exemplary embodiment, for instance, a first key in the touch-sensitive input panel may be representative of the characters "Q," "W," and "E," a second key may be representative of characters "R," "T," and "Y," etc. Therefore, if the user wishes to set forth the character "E" followed by the character "R," the user can position a digit over the first key and slide the digit from the first key to the second key. A shapewriting model (a computer-implemented model that models sequences of strokes set forth by users) and a language model can be employed to disambiguate between potential words that are set forth by the user through the sequence of strokes. Furthermore, various techniques may be employed that allow the user to indicate that a character is to be repeated or that two or more characters represented by a single key are desirably set forth in a sequence. For instance, the user may desirably set forth the character sequence "E," "R," "R." Continuing with the exemplary keys set forth above, the user can position the digit over the first key, transition the digit over the touch-sensitive input panel to the second key, and thereafter, for instance, make a small circular motion with the digit on the second key, temporarily pause the digit on the second key, or the like, to indicate that the character "R" represented by the second key is desirably set forth by the user twice in sequence.

In an exemplary embodiment, the touch-sensitive input panel can be displayed as a soft keyboard on a touch-sensitive screen of a mobile computing device. Furthermore, the touch-sensitive input panel may be ergonomically arranged to allow for the user to hold the mobile computing device with a single hand and perform strokes through utilization of a thumb of the hand of the user. For example, keys in the touch-sensitive input panel can be angularly offset from edges of the touch-sensitive screen to correspond to the radial extent of the thumb of the user while the user is holding the mobile computing device. Therefore, the user can hold the mobile computing device with one hand and reach each key in the touch-sensitive input panel with her thumb. As keys can be representative of multiple characters, the user can recollect more readily the position of keys in the touch-sensitive input panel such that the user need not look at the touch-sensitive input panel when setting forth text.

In other embodiments, the touch-sensitive input panel can be included as an accessory to some other device and/or may be integral to some other device. For example, a steering wheel of an automobile may be configured to include the touch-sensitive input panel, wherein the touch-sensitive input panel may be a capacitive touch-sensitive pad. In an exemplary embodiment, the touch-sensitive input panel may be disabled unless it is detected that the automobile is stationary. In another exemplary embodiment, the touch-sensitive input panel may be positioned as a portion of a housing of a computing device. For instance, a back portion of a mobile telephone, tablet computing device, or the like may be configured with the touch-sensitive input panel. Since there can be a relatively small number of character keys (for instance, eight) in the touch-sensitive input panel, the user need not, in many cases, view the touch-sensitive input panel when entering text. Through utilization of memory of the user, the user can generate shapes that connect keys representative of respective characters included in the text desirably entered by the user, such that the user need not view the keys when selecting such keys (through shapewriting). Still further, audio feedback can be provided to the user to inform the user of a word that probabilistically selected based at least in part upon user interaction with the touch-sensitive input panel. Again, this allows the user to position her gaze elsewhere (other than on a display screen). If the word output audibly does not match the intent of the user, the user can, through a voice command or a gesture, cause such word to be erased (or replaced with a next-most probably word).

Moreover, in an exemplary embodiment, the user can supplement a sequence of strokes with voice commands. Therefore, for example, the user can set forth a continuous sequence of strokes over keys in the touch-sensitive input panel to enter the word "hello." While setting forth such continuous sequence of strokes, the user can speak the word "hello." The combination of the continuous sequence of strokes with voice recognition technologies can cause intent of the user to be relatively accurately ascertained, such that, for instance, the word "hello" is determined as desirably being entered by the user.

Other aspects will be appreciated upon reading and understanding the attached figures and description.

DETAILED DESCRIPTION

Figure 1:
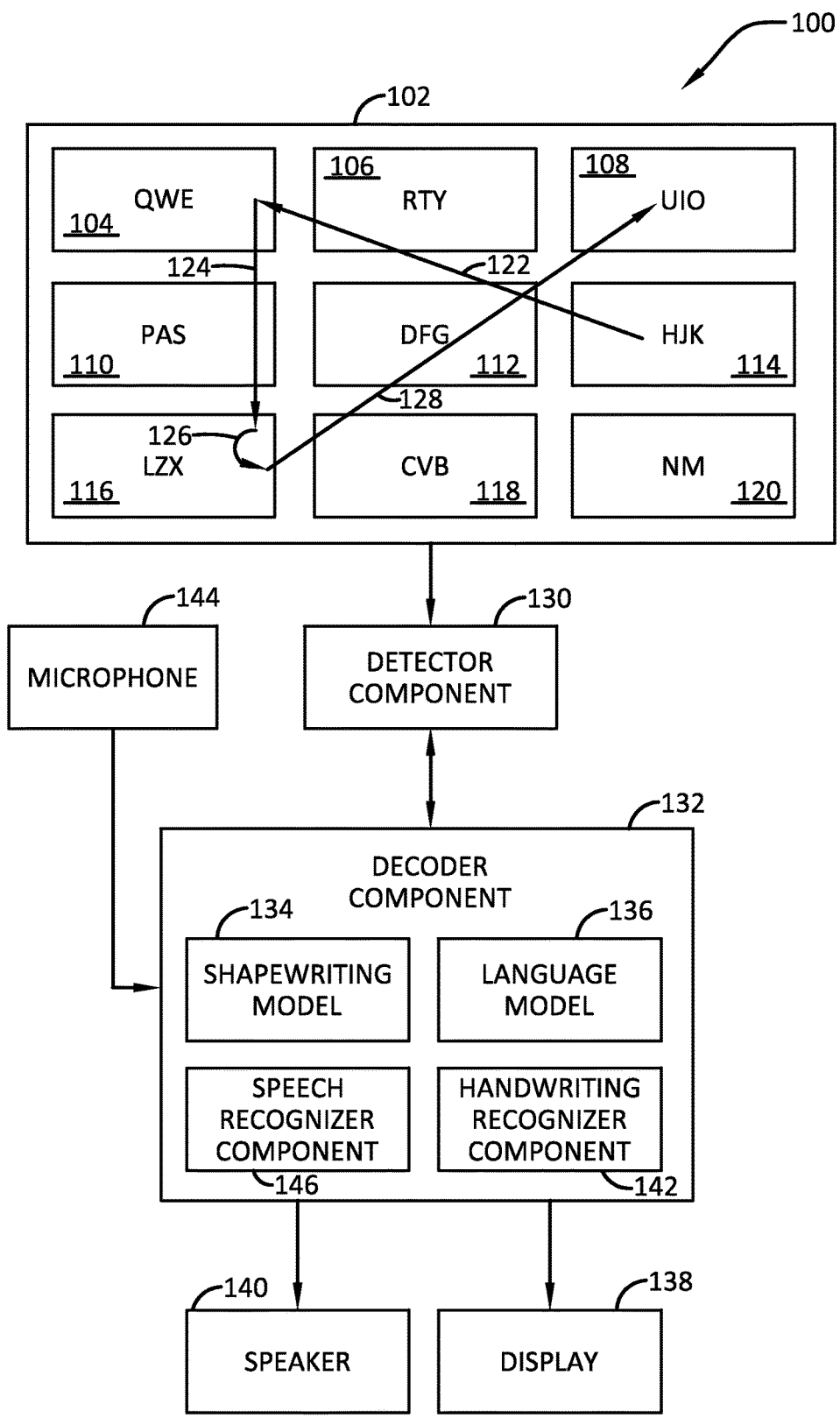
FIG. 1 is a functional block diagram of an exemplary system that facilitates decoding text entered by way of a touch-sensitive input panel by way of shapewriting.

Various technologies pertaining to entry of text by way of shapewriting over a touch-sensitive input panel will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The term "shapewriting" is intended to refer to the continuous transition of a digit over a touch-sensitive input panel to select character keys (rather than the tapping of discrete character keys in the touch-sensitive input panel).

With reference now to FIG. 1, an exemplary system 100 that facilitates decoding text input by way of shapewriting is illustrated. The system 100 comprises a touch-sensitive input panel 102. In an exemplary embodiment, the touch-sensitive input panel 102 may be displayed on a touch-sensitive display of a mobile computing device, such as a mobile telephone, a tablet computing device, an ultra-book, or the like. As will be shown below, in other embodiments, the touch-sensitive input panel 102 may be a capacitive touchpad, which can be positioned on a housing of a computing device, such as on a rearward portion of a mobile computing device. In still other embodiments, the touch-sensitive input panel 102 may be integral to or configured to be an accessory to a computing device. For instance, the touch-sensitive input panel 102 may be integral to a steering wheel of a car, may be coupled to a steering wheel of a car, may be positioned on an armrest of a chair, etc.

The touch-sensitive input panel 102 comprises a plurality of keys 104-120. In the embodiment shown in FIG. 1, each of the keys 104-120 are character keys, in that each key is representative of a respective plurality of characters. The touch-sensitive input panel 102 may also include additional keys, such as an "enter" key, a space bar key, numerical keys, and other keys found on conventional keyboards.

Again, as shown, each of the keys 104-120 in the touch-sensitive input panel 102 is representative of a respective plurality of characters. For example, the key 104 is representative of the characters "Q," "W," and "E," the key 106 is representative of the characters "R," "T," and "Y," etc. Accordingly, the characters in the touch-sensitive input panel 102 are arranged in accordance with a QWERTY keyboard. In other embodiments, characters can be arranged in alphabetical order or some other suitable arrangement.

In an exemplary embodiment, the touch-sensitive input panel 102 can be designed to facilitate eyes-free entry of text, in that a user of the touch-sensitive input panel 102 need not view the touch-sensitive input panel 102 when entering text. Thus, in an exemplary embodiment, the touch-sensitive input panel 102 can be configured to receive input from a digit of a user by way of shapewriting (e.g., a continuous sequence of strokes over the touch-sensitive input panel 102). A stroke, as the term is used herein, is the transition of a digit (e.g., a thumb) of the user from a first key in the plurality of keys 104-120 to a second key in the plurality of keys 104-120 while the digit maintains contact with the touch-sensitive input panel 102. A continuous sequence of strokes then, is a sequence of such strokes, where the digit of the user maintains contact with the touch-sensitive input panel 102 throughout the sequence of strokes. In other words, rather than the user individually tapping keys on the touch-sensitive input panel 102, the user can employ the digit (or a stylus or pen) to connect keys that are representative of respective letters in a desired word. In an example, a user may desirably employ the touch-sensitive input panel 102 to enter the word "hello." The user can initially place her digit on the key 114, which represents the characters "H," "J," and "K." The user may then transition her digit from the key 114 to the key 104, which represents the characters "Q," "W," and "E." The transition from the key 114 to the key 104 is shown as being a first stroke 122. While the digit maintains contact with the touch-sensitive input panel 102, the user can transition the digit from the key 104 to the key 116, which represents the characters "L," "Z," and "X." Accordingly, by transitioning from the key 104 to the key 116, the user has set forth a second stroke 124. Thus, the user has selected keys representative of the first three letters of the word "hello."

At this point, the user desires to indicate a subsequent selection of the letter "L" in the word "hello." This can be undertaken in a variety of manners. In an example, the user can set forth a third stroke 126, which may be a circular stroke undertaken over the key 116. Accordingly, through a relatively small stroke, the user can indicate that she desires to select another character represented by the key 116. In another exemplary embodiment, the user can pause over the key 116 without setting forth another stroke. Again, such pause can be indicative of a desire to consecutively select the key 116. The user may then set forth a fourth stroke 128 by transitioning her digit from the key 116 to the key 108. Subsequent to the fourth stroke 128 being set forth by the user, the user can remove her digit from the touch-sensitive input panel 102. While the sequence of strokes 122-128 are shown as being discrete strokes, it is to be understood that, in practice, a trace of the digit of the user over the touch-sensitive input panel 102 may appear as a continuous, curved shape with no readily ascertainable differentiation between strokes.

The system further 100 comprises a detector component 130 that detects strokes set forth by the user over the touch-sensitive input panel 102. Therefore, for example, the detector component 130 can detect the sequence of strokes 122-128, wherein the user transitions her digit from the key 114 to the key 104, followed by transition of her digit to the key 116, followed by her transition of her digit to the key 108.

A decoder component 132 is in communication with the detector component 130 and decodes the sequence of strokes 122-128 set forth by the user of the touch sensitive input panel 102, such that the decoder component 132 determines a sequence of characters (e.g., a word) desirably set forth by such user. Pursuant to an example, the decoder component 132 can receive a signal from the detector component 130 that is indicative of the sequence of strokes 122-128 set forth by the user over the touch-sensitive input panel 102, and can decode such sequence of strokes 122-128 and output the word "hello." As each of the keys 104-120 is representative of a respective plurality of characters, the decoder component 132 can disambiguate between potential words that can be constructed based upon the strokes set forth by the user (e.g., based upon characters in respective keys over which a trace of the digit has passed or to which the trace of the digit is proximate). Still further, the decoder component 132 can be configured to correct for possible spelling errors entered by the user, as well as errors in position of the digit of the user over the keys 104-120 in the touch-sensitive input panel 102. As noted above, the touch-sensitive input panel 102 may be particularly configured for eyes-free entry of text by the user of the touch sensitive input panel 102. Therefore, when the user is interacting with the touch-sensitive input panel, her digit may not be positioned precisely over respective keys that are desirably selected by the user.

In connection with performing such decoding, the decoder component 134 can comprise a shapewriting model 134 that is trained using labeled words and corresponding traces over touch-sensitive input panels set forth by users. With more particularity, during a data collection/model training phase, a user can be instructed to set forth a trace (e.g., continuous sequence of strokes) over a touch-sensitive input panel for a prescribed word. Position of such trace can be assigned to the word, and such operation can be repeated for multiple different users and multiple different words. As can be recognized, variances can be learned and/or applied to traces for certain words, such that the resultant shape writing model 134 can relatively accurately model sequences of strokes for a variety of different words in a predefined dictionary.

Furthermore, the decoder component 132 can optionally include a language model 136 for a particular language, such as English, Japanese, German, or the like. The language model 136 can be employed to probabilistically disambiguate between potential words based upon previous words set forth by the user.

The system 100 may optionally comprise a display 138 that can display text entered by the user by way of the touch-sensitive input panel 102. In an exemplary embodiment, the touch-sensitive input panel 102 may be a soft input panel displayed on the display 138 (such that the display is a touch-sensitive display). In another exemplary embodiment, the display 138 may be a heads-up display in an automobile, a display on a projector, a display on a conventional television or computer screen, or the like. Accordingly, it is to be understood that the touch-sensitive input panel 102, the detector component 130, and/or the decoder component 132 may be included in a separate device from the display 138 (e.g., as an accessory).

The system 100 may further optionally include a speaker 140 that can audibly output a word or sequence of words decoded by the decoder component 132 based upon sequences of strokes detected by the detector component 130. In an exemplary embodiment, the speaker 140 can audibly output the word "hello" in response to the user performing the sequence of strokes 122-128 over the touch sensitive input panel 102. Accordingly, the user need not look at the display 138 to receive confirmation that the word desirably entered by the user has been accurately decoded. Alternatively, if the decoder component 132 incorrectly decodes a word based upon the sequence of strokes 122-128 detected by the detector component 130, the user can receive audible feedback that informs the user of the incorrect decoding of the word. For instance, if the decoder component 132 decodes the word desirably set forth by the user as being "orange," then the user can quickly ascertain that the decoder component 132 has incorrectly decoded the word desirably set forth by the user. The user may then press some button (not shown) that causes the decoder component 132 to output a next most probable word, which can be audibly output by the speaker 140. Such process can continue until the user hears the word desirably entered by such user. In other embodiments, the user, by way of a gesture or voice command, can indicate a desire to re-perform the sequence of strokes 122-128 such that the previously decoded word is deleted. In still another example, the decoder component 132 can decode a word prior to the sequence of strokes being completed, and display such word prior to the sequence of strokes being completed. For instance, as the user sets forth a sequence of strokes, a plurality of potential words can be displayed to the user.

Furthermore, it can be recognized that the decoder component 132 can employ active learning to update the shapewriting model 134 and/or the language model 136 based upon feedback set forth by the user of the touch-sensitive input panel 102 when setting forth sequences of strokes.

That is, the shapewriting model 134 can be refined based upon size of the digit of the user used to set forth the trace over the touch-sensitive input panel 102, shape of traces set forth by the user over the touch-sensitive input panel 102, etc. Similarly, the dictionary utilized by the shapewriting model 134 and/or the language model 136 can be updated based upon words frequently employed by the user of the touch-sensitive input panel 102 and/or an application being executed. For example, if the user desires to set forth a name of a person that is not included in the dictionary of the shapewriting model 134, the user can inform the decoder component 132 of the name such that subsequent sequences of strokes corresponding to such name can be recognized and decoded by the decoder component 132. In another example, a dictionary can customized based upon application; for instance, words/sequences of characters set forth by the user when employing a text messaging application may be different from words/sequences of characters set forth by the user when employing an email or word processing application.

In certain situations, the user of the touch-sensitive input panel 102 may desire to generate text that is not included in a dictionary employed by the shapewriting model 134 and/or the language model 136. In an exemplary embodiment, the decoder component 132 can include a handwriting recognizer component 142 that can recognize handwritten letters set forth by the user over the touch-sensitive input panel 102 or some other proximate touch-sensitive device, such as a portion of a touch-sensitive display that is not displaying the touch-sensitive input panel 102. In an example, the user may desire to set forth the sequence of characters "whoooooaaah." Such sequence of characters may not be included in a dictionary used to decode traces by the shapewriting model 134 and/or the language model 136. To allow the user to set forth such sequence of characters without having to look at the touch sensitive input panel 102 and discreetly tap keys, the system 100 can support handwriting recognition, wherein the user can cause the touch-sensitive input panel 102 to enter into a handwriting recognition mode through provision of a voice command, gesture, selection of a button, or the like. Once in the handwriting recognition mode, the user can trace characters on the touch-sensitive input panel 102, and the handwriting recognizer component 142 can recognize the characters being entered by the user. Therefore, the user can first handwrite the letter "w," and then may set forth a gesture indicating that the character has been completed. The user may thereafter handwrite the letter "h," which again can be recognized by the handwriting recognizer component 142. This process can continue until the user has set forth the desired sequence of characters. Subsequently, the user, through a voice command, gesture, or the like, can cause the touch-sensitive input panel 102 to transition back to shapewriting mode. Other modes are also possible, such as a mode that supports tapping of keys, if such mode is desired by the user.

The system 100 may optionally include a microphone 144 that can receive voice input from the user. The user, as noted above, can set forth a voice indication that the decoder component 132 has improperly decoded a sequence of strokes, and the microphone can receive such voice indication. In another exemplary embodiment, the decoder component 132 can optionally include a speech recognizer component 146 that is configured to receive spoken utterances of the user and recognize words therein. In an exemplary embodiment, the user can verbally output words that are also entered by way of a trace over the touch-sensitive input panel 102, such that the spoken words supplement the sequence of strokes and vice versa. Thus, for example, the shapewriting model 134 can receive an indication of a most probable word output by the speech recognizer component 146 (where the spoken word was initially received from the microphone 144) and can utilize such output to further assist in decoding a trace set forth over the touch-sensitive input panel 102. In another embodiment, the speech recognizer component 146 can receive a most probable word output by the shapewriting model 134 based upon a trace detected by the detector component 130, and can utilize such output as a feature for decoding the spoken word. The utilization of the speech recognizer component 146, the shapewriting model 134, and the language model 136, can enhance accuracy of decoding.

While not shown, the system 100 may optionally comprise hardware and/or software that facilitates tracking gaze of the user, which can be used to supplement decoding of the sequence of strokes set forth by the user. For instance, a camera and associated software can be configured to estimate the location of the gaze of the user, which can be provided as input to the decoder component 132. In yet another exemplary embodiment, the system 100 may comprise hardware and/or software that facilitates receipt of neural data, such as electrostatic signals emitted from a body of the user. Again, such information can be employed as input to the decoder component 132, and can be used in connection with decoding the sequence of strokes set forth by the user.

Other exemplary features pertaining to the touch-sensitive input panel 102 will now be described. As noted above, the touch-sensitive input panel 102 can be ergonomically arranged to facilitate receipt of strokes from a thumb of the user while the user is holding a mobile computing device, operating a vehicle, or the like. Accordingly, with respect to a mobile computing device, the plurality of keys 104-120 can be angularly offset from a bottom edge, top edge, and side edge of the display screen of the mobile computing device, such that the lines defining boundaries of the keys are not parallel with the edges of the display. Moreover, as will be shown below, the keys can be curved, arced, or slanted relative to edges of the display.

Additionally, to facilitate muscle memory input of a sequence of strokes, different portions of the touch-sensitive input panel 102 may be provided with different textures and/or elevations relative to other portions of the touch-sensitive input panel 102. For instance, as shown, keys in the touch-sensitive input panel 102 may be separated by respective boundaries. Such boundaries may be manufactured in a material that is different from the material utilized when manufacturing the keys 104-120. Therefore, the user can receive tactile feedback as to position of a digit on the touch-sensitive input panel 102. In other exemplary embodiments, the touch-sensitive input panel 102 can be configured to output haptic feedback as the digit of the user transitions over boundaries of the touch-sensitive input panel 102. Specifically, for instance, as a digit of the user crosses a boundary between keys, an electrostatic signal can be output by the touch-sensitive input panel 104. Again, such feedback can allow the user to ascertain that a boundary or boundaries between keys are being transitioned over by the digit. Still further, keys themselves may have different textures: for example, a first key can have a first texture, and a second (adjacent) key may have a second texture (different from the first texture), such that, by feel, the user can differentiate between the first and second key. Therefore, the first key may be smoother than the second key or vice versa.

In yet another exemplary embodiment, elevation of keys may be different in the touch-sensitive input panel 102. For instance, the keys 104-108 can be in a first row having a first elevation relative to a base, the keys 110-114 can be in a second row having a second elevation relative to the base, and the keys 116-120 can be in a third row having a third elevation relative to the base. Thus, by sensing different elevations with her digit, the user can estimate a position of the digit on the touch-sensitive input panel 102. Likewise, columns of keys can have different elevations relative to a base, or each key can have a different elevation.

Further, boundaries between keys can be configured as bumps or channels, such that the user receives tactile feedback as her digit transitions over the bumps or channels. Therefore, it is to be understood that the touch-sensitive input panel 102 may have various ridges, bumps, etc., to allow the user to tactilely ascertain where her digit is (e.g., upon which key or in which row or columns) as the digit is transitioning over the face of the touch-sensitive input panel 102.

Additionally, shapewriting by way of the touch-sensitive input panel 102 can be utilized in connection with performing a global search over a data store or collection of data stores associated with a computing device. In an exemplary embodiment, a user may indicate her desire to search over contents of a particular application or data repository. Thereafter, the user can employ shapewriting as described above to enter text that is desirably the subject of a search (to set forth a query). For instance, the user may desire to search for a contact in a list of contacts. The user can employ shapewriting to search for the name of the contact. For instance, after selecting a plurality of keys through a sequence of strokes over the touch-sensitive input panel, a computing device can audibly output a name that is being searched for that corresponds to the plurality of strokes. Subsequently, the user can cause an action to be undertaken with respect to the selected contact. For instance, the user can indicate a desire to e-mail the contact, call the contact, etc. It is to be understood that this is simply an example of a query that can be performed through utilization of shapewriting, and the type of global searching that can be performed using aspects associated with FIG. 1 is not to be limited by such example.

Figure 2:
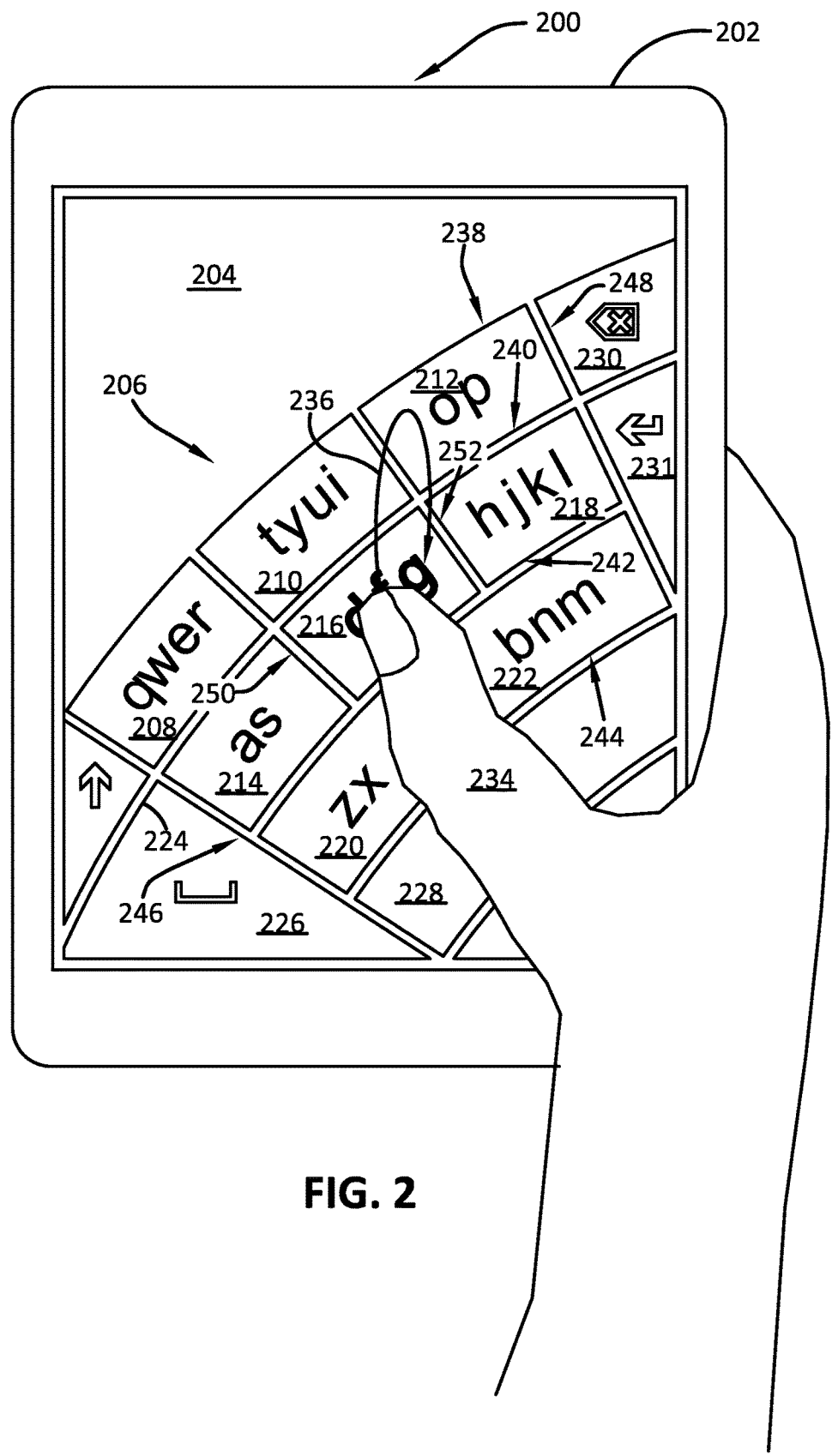
FIG. 2 depicts a user entering text via shapewriting by using a touch-sensitive input panel ergonomically designed for text input by a thumb of the user.

Now referring to FIG. 2, an exemplary mobile computing device 200 is illustrated. The mobile computing device 200 may be any suitable type of mobile computing device. The mobile computing device 200 comprises a housing 202, which can house hardware of the mobile computing device 200. The mobile computing device 200 further includes a touch-sensitive display 204 positioned in an aperture of the housing 202. The touch-sensitive display 204 is shown as displaying a soft input panel (SIP) 206, which comprises a plurality of character keys 208-222, wherein each key in the character keys 208-222 is representative of a respective plurality of characters. As used herein, the term "soft input panel" is used broadly and includes any virtual keyboard or touchscreen keyboard.

The soft input panel 206 further comprises a mode key 224, wherein selection of the mode key 224 can cause characters in the character keys 208-220 to be presented as capital letters in the SIP 206. The soft input panel 206 further comprises a space key 226, wherein selection of the space key 226 places a space between characters. A language key 228 can cause a language of characters and/or a dictionary of terms to be altered. For example, selection of the language key 228 can cause language of the characters in the character keys 208-222 to change from English to Japanese, as well as cause an underlying dictionary and/or language model to alter from English to Japanese. Other languages are also contemplated. A backspace key 230, when selected by the user, causes a most recently entered character to be deleted, and an enter key 231, when selected by the user, can introduce a new line, initiate a particular action, or the like.

The SIP 206 is ergonomically arranged to map to the radial extent of a thumb 234 of a user of the mobile computing device 200 when the user is holding the mobile computing device 200 with one hand. Accordingly, the user can enter text using the SIP 206 using her thumb while gripping the mobile computing device 200. This facilitates entry of text using the SIP 206 without requiring the user to view the touch-sensitive display 204 when shapewriting using the SIP 206.

Other exemplary layouts that are ergonomically arranged to allow for input of text by way of the thumb 234 are set forth below. In the example shown in FIG. 2, the user may desire to enter the word "dog" using the SIP 206. To enter such word, the user can initially position her thumb 234 on the key 216, which represents the letter "d" (along with the letters "f" and "g"). The user may then transition the thumb 234 to the key 212, which represents the letter "o" (along with the letter "p"). Thereafter, the user can transition her thumb 234 over the SIP 206 back to the key 216, which represents the letter "g." This action is shown by the trace 236, which is a continuous sequence of strokes from the key 216 to the key 212 and back to the key 216. When entering the word "dog," the thumb 234 of the user maintains contact with the touch-sensitive display 204 (and thus, with the SIP 206 displayed thereon). When the user has completed the word, the user may lift her thumb 234 from the touch-sensitive display 204.

In the exemplary embodiment shown in FIG. 2, the SIP 206 includes a curved upper boundary 238. Position of the curved upper boundary 238 on the touch-sensitive display 204 may be based upon a swipe of the thumb 234 over the touch-sensitive display 204. For example, the curved upper boundary 238 can correspond to a maximum radial extent of the thumb 234 of the user when the user is holding the mobile computing device 200 with her right hand. The SIP 206 may also include a plurality of internal boundaries 240-244, wherein the internal boundaries 240-244 are concentric with the upper curved boundary 238 and each other. Boundaries 246 and 248 may define an exterior of the plurality of character keys 208-222, and may extend from a centroid of the curved boundaries 238-244. A plurality of internal boundaries 250 and 252 may further be configured to separate keys in the character keys 208-222.

As noted above, in an exemplary embodiment, the mobile computing device 200 can be configured to provide haptic feedback to the user when the thumb 234 of the user transitions over any of the boundaries 238-252 in the soft input panel 206. In the example, when the user is desiring to enter the word "dog," electrostatic feedback can be provided to the user when the thumb 234 transitions over the boundary 240. Further, electrostatic charge can be provided as the thumb 234 of the user transitions over the boundary 252. Another electrostatic charge can be output as the thumb 234 of the user transitions over the boundary 240, and a final electrostatic charge can be provided to the thumb 234 of the user when the thumb 234 transitions over the boundary 252 during the trace 236.

Figure 3:
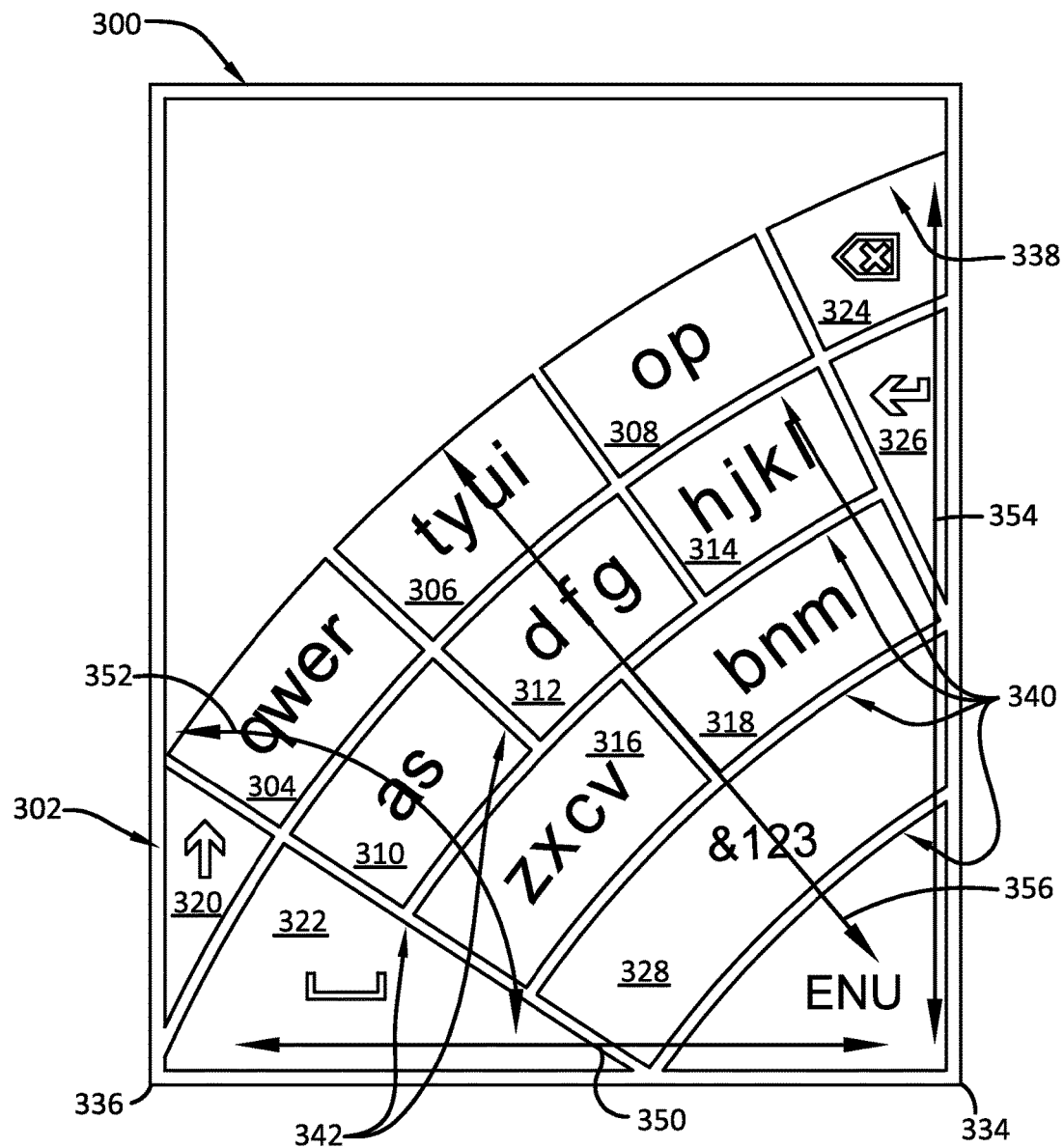
FIGS. 3-8 illustrate exemplary touch-sensitive input panel layouts.

FIG. 3 shows an exemplary touchscreen 300 for a computing device, such as a tablet or mobile phone. The touchscreen 300 comprises a SIP 302 that allows a user to select text characters and enter other commands, such as "enter" and "backspace," by touching or tracing over the different regions of the touchscreen 300. The SIP 302 can be used for many different tasks, such as writing text messages or emails, entering data on a website, performing a global search, etc.

The SIP 302 comprises a plurality of keys 304-330. Each of the keys can be used to perform a different command by touching the key. Exemplary commands can include entering a text character, backspacing, shifting to a different set of keys, etc.

The SIP 302 can be configured to be used by a person holding a computing device with one hand. For example, a user can grip a mobile computing device with his right hand at the bottom right corner and use his right thumb to touch or trace over the various keys of the SIP 302, or grip a mobile computing device with his left hand at the bottom left corner and use his left thumb to touch the various keys of the SIP 302. Each of the SIP embodiments described herein can be configured to be used by a person holding the computing device with one hand and using the thumb of that hand to touch the keys of the SIP. While the exemplary SIPs shown in FIGS. 3-8 are configured for use by a person holding the computing device with his right hand, other embodiments not shown can be configured for use with the left hand in a similar manner. The keys of a right-handed SIP (e.g., those shown in FIGS. 3-8) can be clustered near the bottom right corner of the touchscreen. For example, the keys of the SIP 302 in FIG. 3 are clustered near the bottom right corner 334 of the touchscreen 300. Similarly, the keys of a left-handed SIP can be clustered near the bottom left corner (e.g., 336) of the touchscreen. Clustering the keys near a corner of the touchscreen can make it easier for a user to reach the keys with his thumb.

The keys of a SIP can be rectangular, triangular, have other polygonal shapes, and/or can have shapes at least partially defined by non-linear boundaries. For example, the keys of the SIP 302 can be partly defined by a plurality of curved or arcuate boundaries, including a curved upper boundary 338 and curved intermediate boundaries 340, partly defined by a plurality of linear boundaries, some of which are labeled 342, and/or partly defined by the linear edges of the touchscreen 300. For example, the key 320 is defined by the left edge of the touchscreen 300, one of the linear boundaries 342, and one of the curved boundaries 340. In some embodiments, the keys can also have rounded corners.

A user's thumb anatomically pivots in an arc motion that is generally centered at a point adjacent her wrist. The keys of a SIP can therefore be arranged in a corresponding arced pattern to allow the user to more naturally move his thumb over different keys. The SIP 302 can comprise curved boundaries between the keys that have a center of curvature located approximately where a user's thumb would pivot about her wrist. For example, in the SIP 302, the curved boundaries 338 and 340 can have one or more centers of curvature below and/or to the right of the bottom right corner 334 of the touchscreen 300. The center(s) of curvature of the curved boundaries 338 and 340 can be located, for example, at or near the bottom right corner of the computing device, or farther away from the touchscreen 300, such as below and to the right of the bottom right corner of the computing device, such as where a user's thumb-wrist joint would be located when holding the computing device in the right hand. In some embodiments, one or more of the curved boundaries 338 340 can be concentric.

In some embodiments, one of the curved boundaries can intersect with the opposite bottom corner of the touchscreen. For example, one of the boundaries 340 intersects with the bottom left corner 336 in FIG. 3. The number of curved boundaries in a SIP can vary, such as from one to 5 or more. In some embodiments, the curved boundaries can be equally spaced apart radially, such that the keys defined between the curved boundaries have an equal radial height (as measured from the center of curvature of the curved boundaries).

Some of the keys of a SIP can be larger or smaller than other keys. For example, some of the keys can have a greater area than other keys. For example, the key 328 in FIG. 3 has a greater area than many of the other keys. Some of the keys can be wider or longer than other keys. For example, the key 328 is longer than the keys 316 and 318, and those keys are longer than the keys 310, 312 and 314. The size of a key can make it easier for a user to locate and touch that key (e.g., locate and trace over the key). More commonly used keys can be made larger in area in some SIPs. For example, the space bar key 322 can be larger than many other keys because the spacebar key is very commonly used. Other, less commonly used keys can be made smaller.

The location of a key on the SIP 302 can also make that key easier or more difficult to reach. For example, the alpha keys (304-318) of the SIP 302 can be clustered in the center of the SIP 302 to make them more readily reachable. Other commonly used keys, such as the backspace key 324, can be located to the side of the letter keys where they are also readily accessible by the user's thumb since they are also positioned along the natural arc path made by the thumb. On the other hand, lesser used keys, such as the language key 330 (labeled "ENU") can be positioned near the bottom/inner corner of the SIP 302 (e.g., near the bottom right corner 334 in FIG. 3) or other fringes of the SIP 302 where it is more difficult to reach. Positioning the keys in a manner similar to a common QWERTY keyboard can also make it easier and faster for a user to locate the keys. For example, the backspace key 324 and return key 326 can be located on the right hand side of the SIP 302, like they are on a QWERTY keyboard, to make locating those keys more intuitive for a user.

A user can have a limited range when using his thumb to touch the keys of a SIP. The thumb range may be limited radially, such as by a maximum radial reach and/or by a minimum radial reach. Depending on the user's anatomy, the way she holds the device, and the size of the device, the maximum and/or minimum radial reach limits of her thumb can vary. The maximum radial boundary of the SIP 302 can be positioned to correspond to the maximum reach limit of the user's thumb. The maximum radial boundary can comprise a curved upper boundary of the SIP, such as the upper boundary 338.

In some cases, a user can bend his thumb inward far enough to reach the bottom corner of the touchscreen 300 near the ball of the thumb, while in other cases there can be a region of the touchscreen 300 adjacent the bottom corner near the ball of the thumb that the user cannot easily reach with his thumb, such as with user's having relatively large thumbs. Thus, in some embodiments, an area of the touchscreen 300 near that bottom corner can be left open or empty and not be part of the SIP 302. The radial limits of the SIP 302 can be set or adjusted by the user swiping his thumb radially in a full range of motion, which can be done to initially invoke or open the SIP 302, for example.

In some embodiments, the SIP 302 can extend angularly (perpendicular to the radial direction) about a 90° angle from one side of the touchscreen to the bottom of the touchscreen, as shown in FIGS. 3-8. In some embodiments, the SIP 302 can also partially border the opposite side edge, as shown in FIGS. 3-8. For instance, in FIG. 3, keys 320 and 322 can appear to intersect with the leftward edge of the touchscreen 300. In other embodiments, the SIP 302 can extend angularly about an angle of less than 90°, such as between 45° and 90°. For example, in some cases a user's thumb can have a limited angular mobility such that it cannot readily be pivoted a full 90° from the side edge of the touchscreen 300 to the bottom edge of the touchscreen 300. Thus, the touchscreen 300, in some embodiments, can have open or non-functional areas near the side edge and/or near the bottom edge that are not part of the SIP 302 and/or do not have any of the keys of the SIP 302. In some embodiments, these non-key regions of the SIP 302 or touchscreen 300 can be used for display purposes instead of input purposes.

In some embodiments, the SIP 302 can be switched between a right handed configuration and a left handed configuration. Thus, if a user switches hands, the SIP 302 can be configured to switch to the opposite bottom corner of the touchscreen 300. In some embodiments, the mobile device can sense which hand the user is holding the device in. For example, the mobile device can comprise gyroscopic sensors, pressure sensors, and/or other types of sensors that can be used to determine which hand the user is holding the device with. In other embodiments, the user can provide an input to cause the SIP 302 to switch sides. For example, the user can press a key in the SIP 302 that can cause the SIP 302 to switch sides or set forth a voice command that causes the SIP 302 to switch sides. In some embodiments, the user can slide his thumb (or any other finger or stylus) laterally across the bottom of the touchscreen (e.g., in the directions of arrow 350 in FIG. 3) to cause the SIP 302 to switch sides. For example, if the SIP 302 is at the bottom right corner 334, the user can slide his thumb from right to left across the bottom of the touchscreen to cause the SIP 302 to switch to the bottom left corner 336. In some embodiments, the user can swipe his thumb in an arc motion about a bottom corner of the touchscreen (e.g., in the directions of arrow 352 in FIG. 3) to cause the SIP 302 to switch to that corner. Various other sensory or user input means can also be used to cause the SIP 302 to switch to a different corner of the touchscreen 300.

The radial and/or angular size of the SIP 302 can also be adjusted. In some embodiments, the radial size of the SIP 302 can be adjusted by swiping the thumb radially from near the bottom corner of the SIP (e.g., in the outward direction of arrow 354 or arrow 356 in FIG. 3). The touchscreen 300 can sense the maximum extent of the user's thumb reach from the radial thumb swipe and the radial size of the SIP 302 can be set or adjusted in response to the swipe and/or based on the user's thumb reach. In some embodiments, the minimum reach of the user's thumb can also be determined from a radial thumb swipe. Thus, the radial boundaries of the SIP 302 can be set or adjusted based on the start and end of the user's radial swipe. In some cases, the user can input a plurality of radial swipes and the average, maximum, minimum, or other function of those swipes can be used to set the radial boundaries of the SIP 302. In some embodiments, the radial boundaries of the SIP 302 can be set or adjusted based on one or more arcuate angular swipes made by the user. For example, a user can input a plurality of arcuate angular swipes at different radial positions to provide a range of reach for the user's thumb. In some embodiments, a user can customize the radial boundaries of the SIP 302 in other manners, such as entering coordinates or dimensions, selecting from pre-set configurations, etc.

Similarly, the angular boundaries of the SIP 302 can be adjusted based on user input. In some embodiments, the angular boundaries of the SIP 302 can be adjusted by swiping angularly in an arc, such as in the directions of arrow 352 in FIG. 3 (or in the opposite direction). The touchscreen 300 can sense the maximum extent of the user's angular thumb reach from one or more swipes and the angular boundaries of the SIP 302 can be set according to the ends of the swipe(s) or some other function of the swipe(s). In some embodiments, a user can customize the angular boundaries of the SIP 302 in other manners, such as entering coordinates or dimensions, selecting from pre-set configurations, etc.

In some embodiments, a user can close or put away the SIP 302 by swiping radially or vertically from near the top of the SIP 302 downward or toward a corner (e.g., in the inward direction of the arrow 354 or the arrow 356 in FIG. 3). Similarly, a user can re-open or bring back up the SIP 302 by swiping vertically or radially from a corner. Such a swipe to re-open the SIP 302 can at the same time be used to measure the thumb reach of the user to size the SIP 302.

In some embodiments, various gestures or other actions can be used to manipulate the SIP 302. Swiping across the touchscreen 300 is one example of such a gesture. Other examples can include double tapping certain keys or region, pinching motions using two fingers, spreading two fingers apart across the touchscreen 300, etc. For example, in some embodiments, double tapping the spacebar key can insert a period.

Flicking or swiping with a finger can provide various functions, as described herein. In some embodiments, flicking or swiping actions can be performed before, after, or during text entry, such as to open or close the SIP 302, to resize the SIP 302, or to switch the SIP 302 to the opposite side or bottom corner.

In some embodiments, the SIP 302 can comprise one key for each letter of the alphabet. In other embodiments, the SIP can include one or more keys that can be used to enter more than one letter, such as in the embodiments shown in FIGS. 3-8. Because the SIP 302 is limited in area by the reach of the user's thumb, space is limited and there may not be enough room to have one key for every letter and keys for other important functions like return, space, shift, etc. Thus, by grouping plural letters on some of the keys, fewer keys are needed and the each key can be made larger so they are easier to locate touch without accidentally touching the adjacent keys.

When a user traces over keys used for plural letters, such as the key 304 in FIG. 3, a disambiguation program/process can be used to determine which letters/words the user intends to enter. For example, the device can analyze plural keys traced over in sequence to determine possible words that the user may be trying to spell. If multiple possible words are determined, the various options can be output (e.g., audibly) to the user for selection (sometimes referred to as Input Method Editor candidates) and/or the device can select one of the words for the user, such as the most commonly typed word or a word that fits grammatically.

In the SIP 302 in FIG. 3, different keys have different numbers of letters associated with them. The keys 304, 306, 314, and 316 each are associated with four letters, the keys 312 and 318 are associated with three letters, and the keys 308 and 310 are associated with two letters. Generally, less commonly used letters, such as "Q" and "Z" can be grouped with more other letters, while more commonly used letters, such as "A" and "O" can be grouped with fewer other letters. In some embodiments, the letters can be grouped such that the various different keys are used more equally in text entry.

With more particularity, the SIP 302 comprises three rows of alphabetic keys, wherein each row includes multiple keys, and each key (or at least a plurality of the keys) represents respective multiple alphabetical characters. The alphabetical characters, in an exemplary embodiment, are arranged in accordance with the QWERTY standard. A first row of keys includes keys 304, 306, and 308, a second row of keys includes keys 310, 312, and 314, and a third row of keys includes keys 316 and 318. As shown, the first row of keys may be the row positioned furthest from the corner 334 (or corner 336) from amongst all rows, the second row of keys may be positioned adjacent to the first row and closer to the corner 334 (or corner 336), and the third row of keys may be positioned adjacent to the second row and still closer to the corner 334 (or corner 336) when compared to position of the first row and the second row. Thus, it can be ascertained that at least one row of keys in the SIP 302 that represent alphabetical characters is composed of two keys, while at least one other row of keys in the SIP 302 that represent alphabetical characters is composed of at least three keys. Causing the third row of keys that are representative of multiple alphabetical characters to be composed of two keys can be undertaken to ease input of alphabetical characters through tracing over such keys by way of the thumb of the user. Further, utilizing eight keys (rather than nine) to represent all alphabetical characters can be found to have little detriment when disambiguating text entered by way of shapewriting over the SIP 302.

As shown, in the first row of keys, the key 304 can represent the alphabetical characters "Q," "W," "E," and "R," the key 306 can represent the alphabetical characters "T," "Y," "U," and "I," and the key 308 can represent the alphabetical characters "O" and "P." Thus, a key that represents four alphabetical characters can be positioned in a row of keys that represent alphabetical characters immediately adjacent to a key that represents two characters. In the second row of keys, the key 310 can represent the alphabetical characters "A" and "S," the key 312 can represent the alphabetical characters "D," "F," and "G," and the key 314 can represent the alphabetical characters "H," "J," "K," and "L." Therefore, a key that represents two alphabetical characters can be positioned in a row of keys that represent alphabetical characters immediately adjacent to a key that represents three alphabetical characters. Additionally, a key that represents three alphabetical characters can be positioned in a row of keys that represent alphabetical characters immediately adjacent to a key that represents four alphabetical characters. Finally, in the third row of keys, the key 316 can represent the characters "Z," "X," "C," and "V," and the key 318 can represent the characters "B," "N," and "M." Again, the third row of keys can include two keys, while the first and second row of keys can each include three keys.

In an exemplary embodiment, arrangement of keys and/or alphabetical characters represented by keys can be selected to substantially optimize the ability of the mobile device to disambiguate text desirably generated by the user through shapewriting over the SIP 302. For example, constraints pertaining to design of the SIP 302 can be set forth: exemplary constraints include a constraint on the sequence or relative layout of alphabetical characters to be represented by keys (e.g., to substantially conform to a QWERTY layout), a constraint that restricts character groupings to which a particular alphabetical character can belong (e.g., an alphabetical character can belong to an arbitrary number of character groups, except that the alphabetical character can only belong to neighboring groups from an initially prescribed group), amongst other constraints.

A dictionary of words that can be generated by way of the SIP 302 can be received, wherein words in the dictionary of words have, for instance, some indication of frequency/probability of use of such words corresponding thereto. Integer programming can be employed to locate groups of characters that satisfy imposed constraints, and an optimization function can be utilized to identify groupings of characters that allow for substantially optimal disambiguation. In an example, a word in the English language desirably entered by way of the SIP 302 can be "this"; first, the thumb of the user is positioned over the key 306 and then transitioned to the key 314, followed by transition of the thumb to the key 306, followed by transition of the thumb to the key 310. All possible candidate words that can be generated using such sequence of keys, with characters grouped as shown in FIG. 3, can be identified, sorted by probability or frequency of use in the English language. A score is then assigned based upon position of the desired word "this" in the candidate words. For instance, if the word "this" is first in the candidate words, a first, high score can be output, while if the word "this" is lower in the candidate words, a lower score (or zero score) can be output. This process can be undertaken for each word in a dictionary, for instance, and for each possible grouping of characters that conforms to the constraints. The grouping of characters with the highest score can be output as the desired grouping of characters. Such score can be a highest aggregate score across all words in the dictionary, potentially with words weighted as a function of frequency of use (popularity) of such words. For instance, the characters grouped as shown in the SIP 302 of FIG. 3 can be optimized for a certain dictionary and scoring function, given constraints of character sequence, maximum number of characters that can be represented by a single key, minimum number of characters that can be represented by a single key, amongst other constraints. In yet another embodiment, the groupings can be optimized based upon a dictionary of a user of the mobile device, as different users may have different vocabularies and use words with differing frequencies.

While integer programming has been set forth above as an exemplary technique for identifying groupings of characters in the SIP 302, it is to be understood that other techniques are contemplated. For example, genetic algorithms can be employed to learn an optimal layout for a certain dictionary of terms with known/assumed frequency/probability of user. Still further, while the SIP 302 illustrates English characters, it is to be understood that groupings of characters can be undertaken using characters of other language, such as Japanese.

Figure 4:
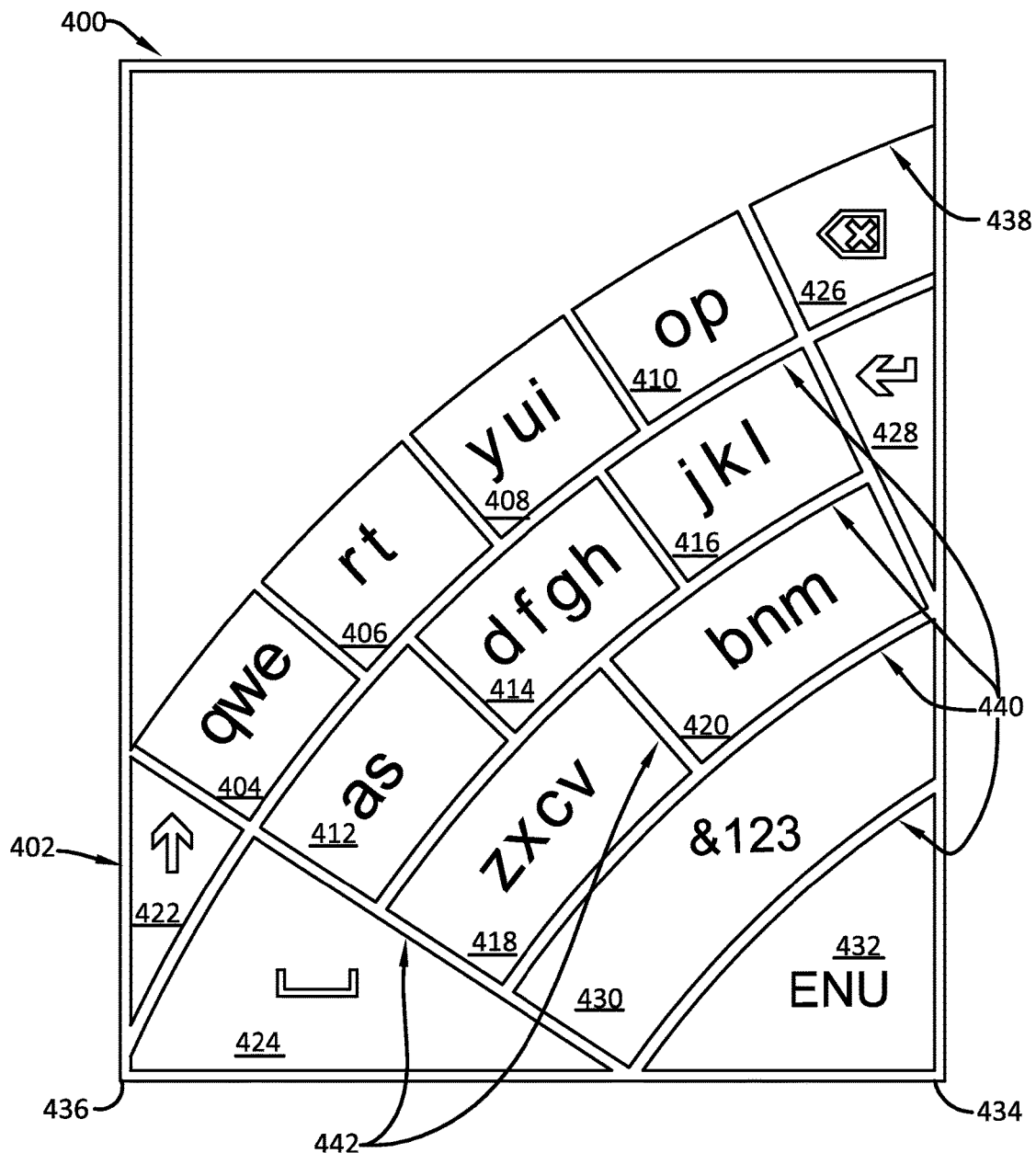

FIG. 4 shows a touchscreen 400 with another embodiment of a SIP 402 having letter group keys 404 through 420. These letter keys are also each associated with more than one letter, though the keys 404-420 are grouped differently than the keys 304-318. The SIP 402 has four letter keys 404-410 across the top row, whereas the SIP 302 has three letter keys 304-308 across the top row, allowing fewer letters on some of the keys of the SIP 402. In various different embodiments, the letters can be grouped in any different manner on any number of different keys of various sizes and positions.

In some embodiments, a SIP can comprise a key that switches the SIP back and forth between having one key for every letter and having one or more keys having groups of letters associated with them. Thus, a user can use such a key to select a text entry style from these different options, depending on particular circumstances or preferences.

In some embodiments, the non-letter keys, such as the keys 422, 424, 426, 428, 430, and 432 can maintain their general position relative to the letter keys when the SIP 402 is switched from one side of the touchscreen to the other, as when a user switches hands. For example, in some embodiments, the spacebar key can remain in a position below the letter keys whether the SIP 402 is on the left or the right side. In other embodiments, the spacebar key can remain to the left, or to the right, of the letter keys whether the SIP is on the left or the right side. In other embodiments, the space bar key can remain positioned adjacent the bottom edge of the touchscreen to the side of the letter keys, as in FIG. 3, such that the spacebar key is to the left of the letter keys when the SIP 402 is on the right side and the spacebar key is on the right side of the letter keys when the SIP 402 is on the left side. Other keys, such as the return key, backspace key, and capitals key can similarly be configured to maintain their positional relationship to the letter keys and/or to each other as the SIP 402 is switched from side to side.

As a user's thumb reaches farther up the SIP 402, the flatter pad of the thumb is used to touch the SIP 402, resulting in a larger contact area when touching the SIP farther from the bottom corner. On the other hand, when the thumb is bent sharply to reach the keys closer to the bottom corner of the SIP 402, the tip of the thumb is used to touch the keys, resulting in a smaller contact area. Thus, in some embodiments, some keys can have different heights and/or areas than other keys. In some embodiments, different rows of keys can have different heights and/or areas than other rows of keys. For example, in some embodiments, the keys farther from the bottom corner of the touchscreen 400 can have a larger height and/or area than the keys closer to the bottom corner. The outermost or uppermost row of keys can have a greater height than the lower rows of keys. The height of the keys can increase gradually from row to row as a function of the distance of the row from the bottom corner to correspond to the flattening of the thumb as it reaches farther up the SIP 402.

The SIP 402 shown in FIG. 4 comprises three rows of alphabetical character keys (also referred to as letter keys), wherein each key in the rows of keys represents alphabetical characters. The first row is composed of four keys: the key 404, which represents the characters "Q," "W," and "E," the key 406, which represents the characters "R" and "T," the key 408, which represents the characters "Y," "U," and "I," and the key 410, which represents the characters "O" and "P." The second row of keys is composed of three keys: the key 412, which represents the characters "A" and "S," the key 414, which represents the characters "D," "F," "G," and "H," and the key 416, which represents the characters "J," "K," and "L." The third row is composed of two keys: the key 418, which represents the characters "Z," "X," "C," and "V," and the key 420, which represents the characters "B," "N," and "M." Accordingly, the rows of alphabetical characters in the SIP 402 include a row with four keys, a row with three keys, and a row with two keys. When choosing character groupings in the keys, for instance, constraints can be set forth, including the constraint that the characters are sequentially arranged in accordance with a QWERTY keyboard, and the constraint on the number of keys in each row. The character groupings across the keys can be optimized for disambiguating words in a dictionary (weighted by frequency of use, for instance) given the constraints.

FIGS. 3-8 show several different embodiments of SIPs having different combinations of the characteristics described above. The SIPs 302, 402, and 802 in FIGS. 3, 4, and 8, respectively, comprise arced boundaries in the angular direction and linear boundaries in the radial direction. The SIPs 502, 602, and 702 in FIGS. 5, 6, and 7, respectively, comprise slanted linear boundaries instead of angular/radial boundaries.

Figure 5:
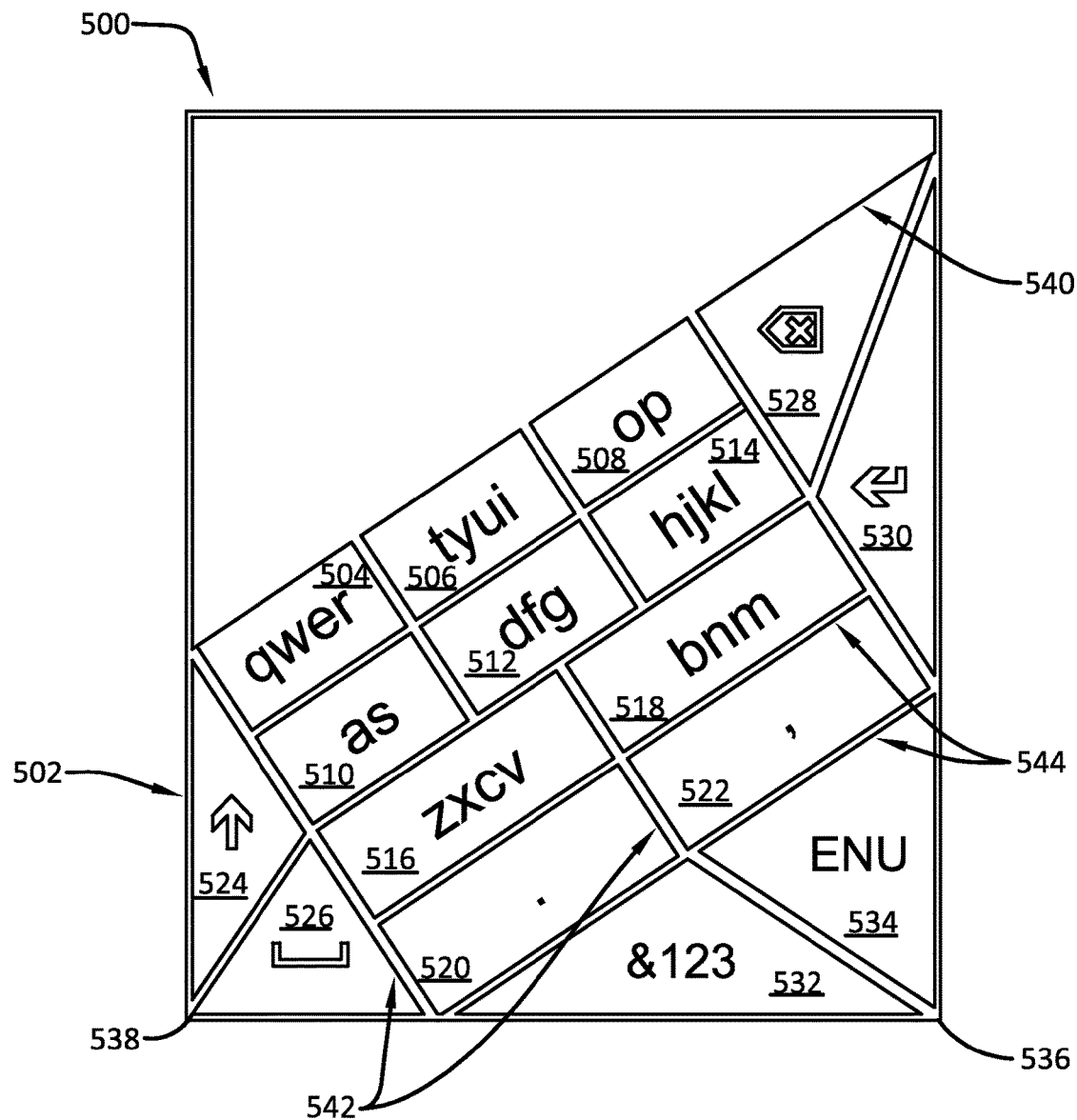

FIG. 5 shows a touchscreen 500 having an embodiment of a SIP 502 comprising keys 504 through 534 that each has a polygonal shape with linear boundaries. The keys 504 through 522 each have a rectangular shape defined by linear boundaries, some of which are labeled 542, that slant from the bottom right toward the top left, and linear boundaries, some of which are labeled 544 and 540, that are perpendicular to the boundaries 542. The keys 524 through 534 are triangular, being partially defined by the slanted boundaries 542, 544, and 540, and partially defined by the orthogonal bottom and side edges of the touchscreen 500. The keys 504-518 are arranged similarly as in the SIP 302 of FIG. 3, with similar groupings of characters across the letter keys 504-518.

Figure 6:
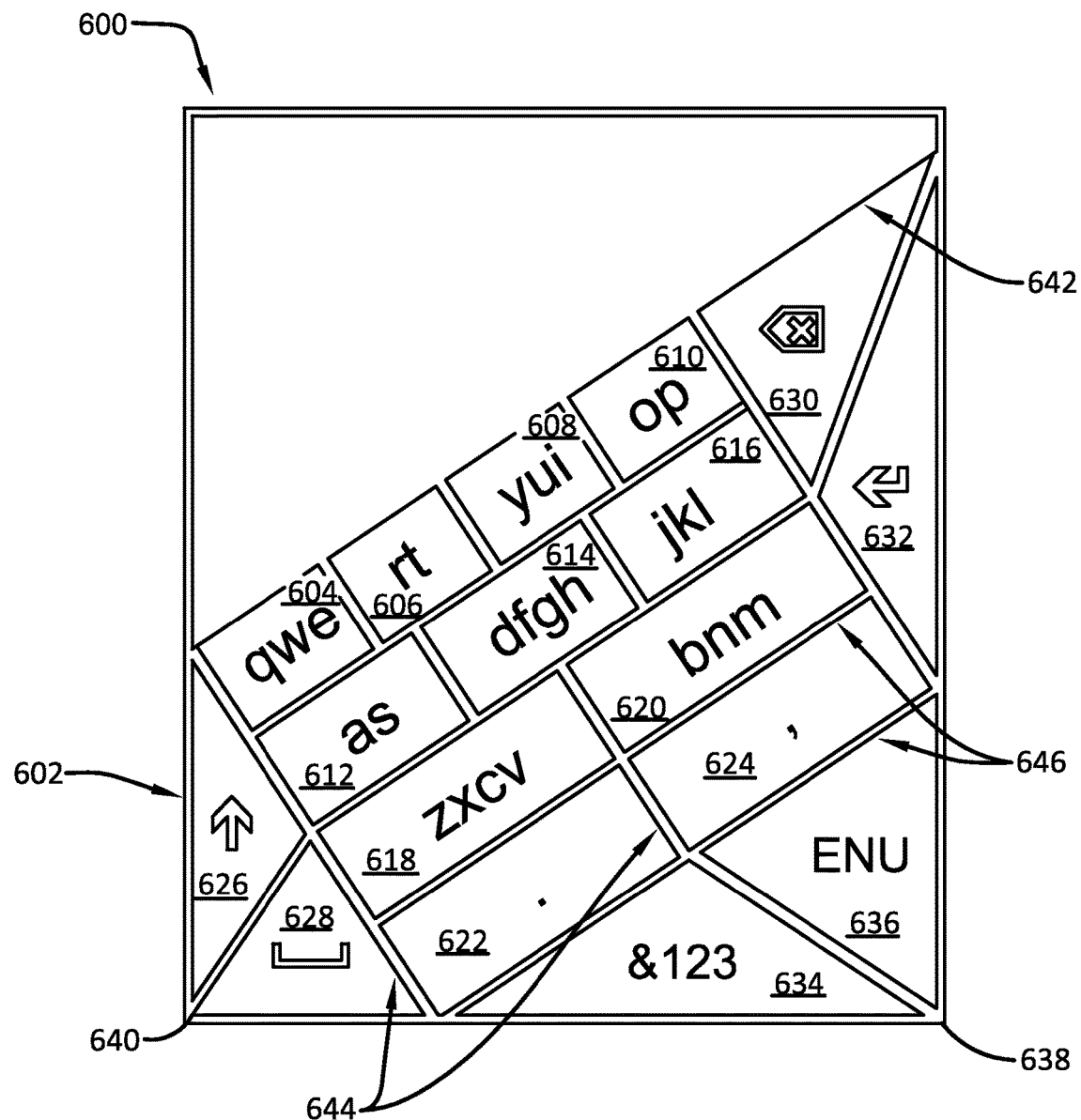

FIG. 6 shows another touchscreen 600 having an embodiment of a SIP 602 comprising keys 604 through 636 that each has a polygonal shape with linear boundaries. The keys 604 through 624 each have a rectangular shape defined by linear boundaries, some of which are labeled 644, that slant from the bottom right toward the top left, and linear boundaries, some of which are labeled 646 and 642, that are perpendicular to the boundaries 644. The keys 626 through 636 are triangular, being partially defined by the slanted boundaries 642, 644, and 646, and partially defined by the orthogonal bottom and side edges of the touchscreen 600. The keys 604-620 are arranged similarly as in the SIP 402 of FIG. 4, with similar groupings of characters across the letter keys 604-620.

Figure 7:
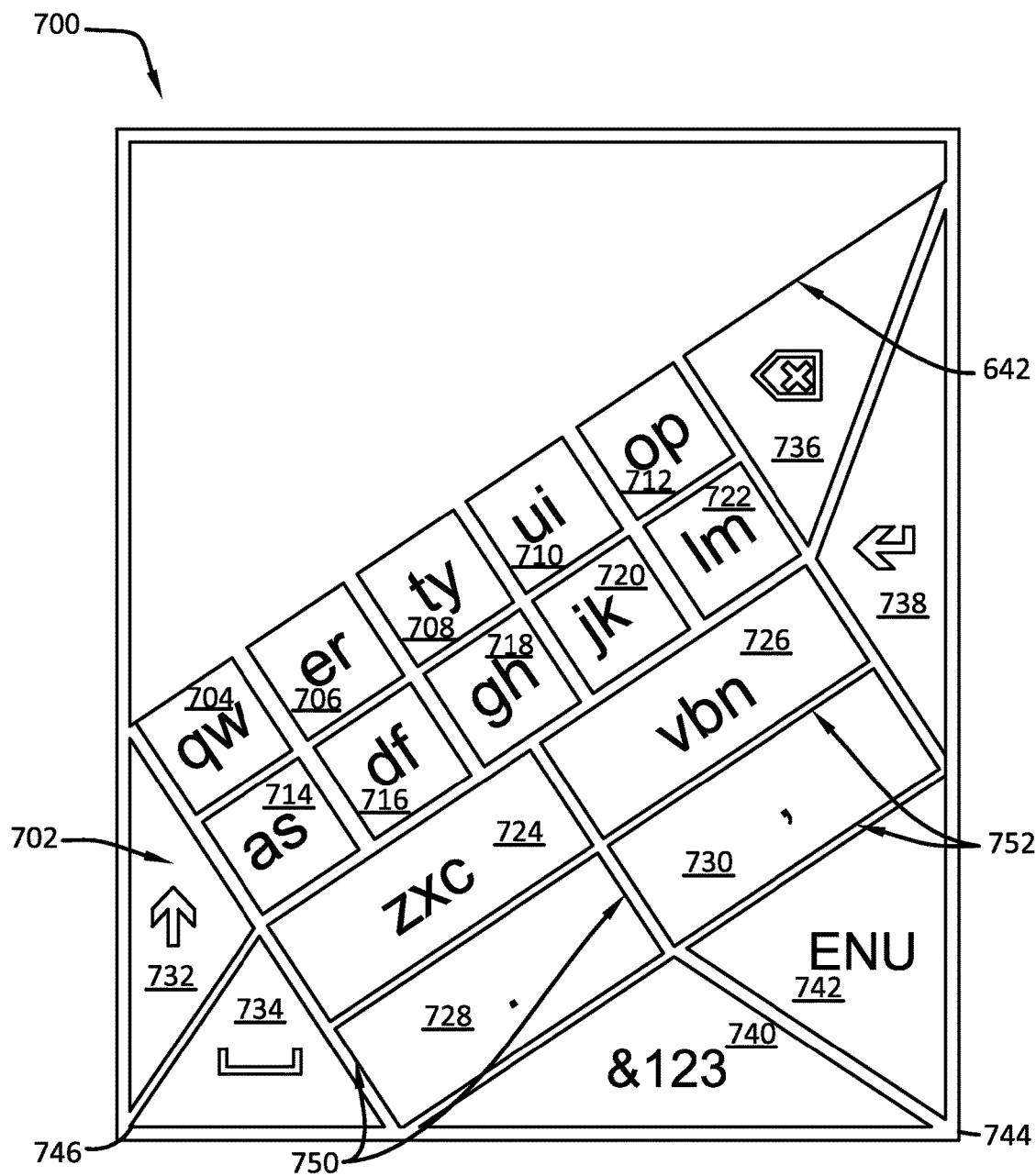

FIG. 7 shows yet another touchscreen 700 having an embodiment of a SIP 702 comprising keys 704 through 742 that each has a polygonal shape with linear boundaries. The keys 704 through 730 each have a rectangular shape defined by linear boundaries, some of which are labeled 750, that slant from the bottom right toward the top left, and linear boundaries, some of which are labeled 752 and 746, that are perpendicular to the boundaries 750. The keys 732 through 742 are triangular, being partially defined by the slanted boundaries 746, 750, and 752, and partially defined by the orthogonal bottom and side edges of the touchscreen 700.

The SIP 702 includes three rows of letter keys, wherein a first row is composed of five keys: 704-712, wherein the key 704 represents the characters "Q" and "W," the key 706 represents the characters "E" and "R," the key 708 represents the characters "T" and "Y," the key 710 represents the characters "U" and "I," and the key 712 represents the characters "O" and "P." The second row is also composed of five keys: 714-722, wherein the key 714 represents the characters "A" and "S," the key 716 represents the characters "D" and "F," the key 718 represents the characters "G" and "H," the key 720 represents the characters "J" and "K," and the key 722 represents the characters "L" and "M." The third row is composed of two keys: 724 and 726, wherein the key 724 represents the characters "Z," "X," and "C," and the key 726 represents the characters "V," "B," and "N." Therefore, the SIP 702 comprises two rows of letter keys that each include five keys and a row of letter keys that include two keys. Further, the SIP 702 comprises keys representative of two alphabetical characters and three alphabetical characters, but fails to include a key that is representative of four alphabetical characters. With respect to the SIP 702, the constraints imposed when determining a manner in which to group alphabetical characters can be a sequence of the characters (QWERTY), a number of rows of characters (e.g., 3), and a number of keys in each of the rows.

Additionally, as shown, the SIP 702 comprises a fourth row that includes keys 728 and 730, wherein such keys are representative of respective punctuation marks, such as a period and comma. The fourth row may additionally include other keys that are representative of punctuation marks commonly used, such as a question mark, colon, semicolon, etc. Still further, the SIP 702 comprises the key 740, which is split from the key 742.

Figure 8:
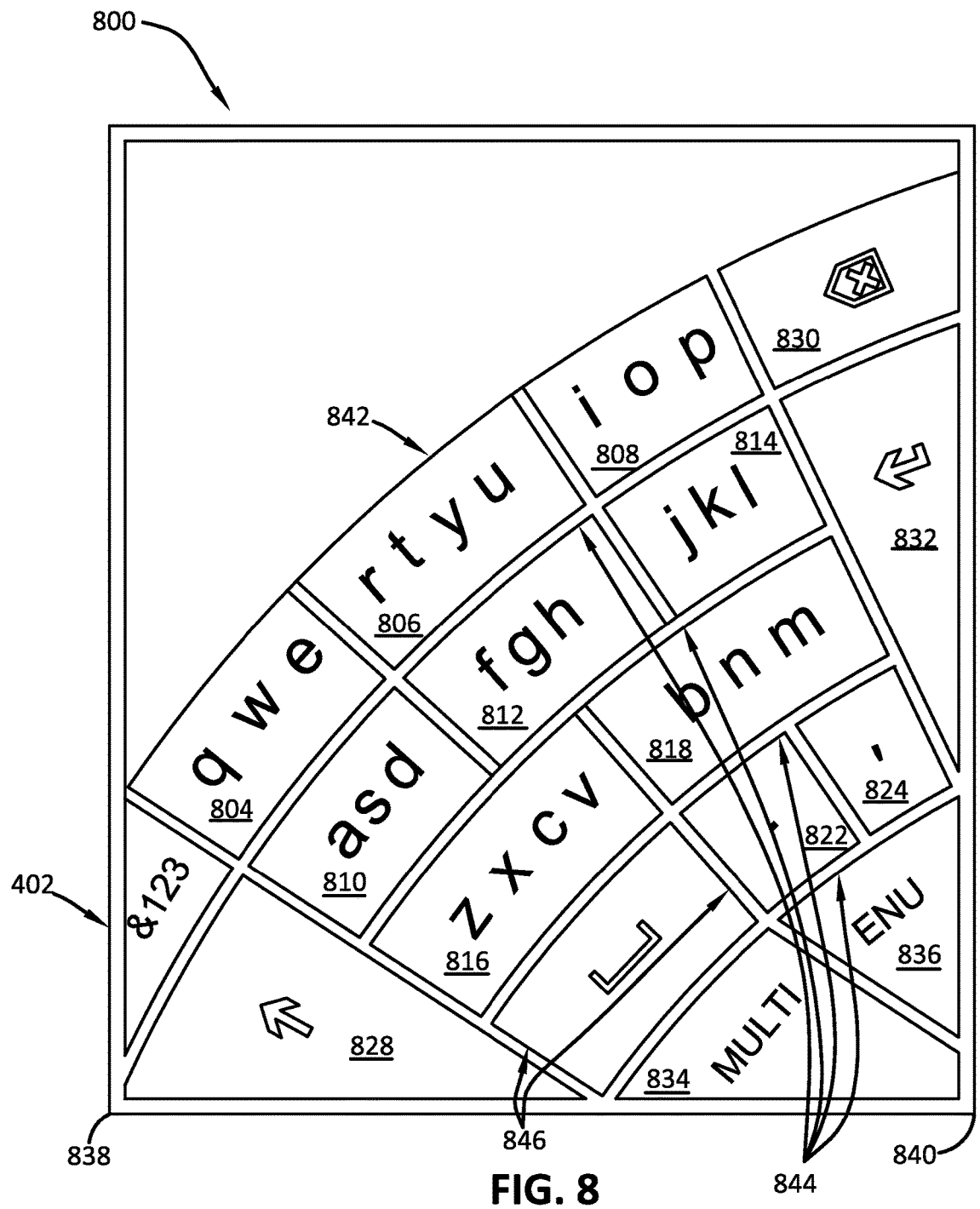

FIG. 8 shows a touchscreen 800 having an embodiment of a SIP 802 comprising keys 804 through 836 that are partially defined by linear slanted radial boundaries, some of which are labeled 846, partially defined by curved or arced boundaries 842 and 844, and/or partially defined by the side edges and bottom edge of the touchscreen 800, much like the SIPs 302 and 402 in FIGS. 3 and 4. The SIP 802 can include a "MULTI" key 834 that allows a user to switch to an alternative key layout, such as a layout having a different key for each letter in the alphabet. This can allow a user to manually type in words that the disambiguation program does not suggest, such as words that are not stored in dictionary of words that the disambiguation program relies upon.

The SIP 802 comprises three rows of letter keys. A first row is composed of three keys: the key 804, which represents the characters "Q," "W," and "E," the key 806, which represents the characters "R," "T," "Y," and "U." and the key 808, which represents the characters "I," "O," and "P." A second row is composed of three keys: the key 810, which represents the characters "A," "S," and "D," the key 812, which represents the characters "F," "G," and "H," and the key 814, which represented the characters "J," "K," and "L." A third row is composed of two keys: the key 816, which represents the characters "Z," "X," "C," and "V," and the key 818, which represents the characters "B," "N," and "M." The groupings of characters with the keys, in the SIP 802, as noted above, can be undertaken to optimize disambiguation of words in a particular dictionary (e.g., the dictionary of words employed by a user of the mobile device that includes the SIP 802) given specified layout constraints.

The SIPs 502, 602, and 702 differ in the grouping of the letters on the letter keys and the number of the letter keys. The SIP 502 comprises three keys 504, 506, 508 in the uppermost row of letter keys and the three keys 510, 512, 514 in the second row of letter keys. The SIP 602 comprises four keys 604, 606, 608, 610 in the uppermost row of letter keys, and three keys 612, 614, 616 in the second row of letter keys. The SIP 702 comprise five keys 704 through 712 in the uppermost row of letter keys, and five keys 714 through 722 in the second row of letter keys. The ten keys 704 through 722 in the SIP 702 each have the same height and width, and each correspond to two letters.

While the SIPs 502, 602, and 702 do not comprise curved or arced rows of keys like the SIPs 302 and 402, they can similarly be configured be accessible by a user's thumb reaching from either of the bottom corners of the touchscreen, and can be sized and switched between the two bottom corners in similar manners. Furthermore, with respect to any of the SIPs described herein, a gesture can cause an SIP to be unhidden (displayed on a touchscreen) or hidden (removed from display on the touchscreen). Furthermore, any of the SIP features described herein can be applied to both the arced SIPs 302 and 402 and the slanted SIPs 502, 602 and 702 in similar manners.

In some embodiments, the SIP can comprise a key, such as the "ENU" key 330, which allows the user to switch between different languages. In some embodiments, the SIP can be configured to be used with non-Latin languages, such as Arabic. In such cases, the layout of the keys and boundaries of the SIP can be adjusted to fit different numbers of characters and other functions that are used for text entry in other languages. Thus, when a user hits the language key to switch to a different language, the layout of the SIP can automatically adjust to a different layout to accommodate the different language.

While the keyboard layouts have been described as being for SIPs in FIGS. 3-8, it is to be understood that such keyboard layouts can be included in other touch-sensitive input panels that facilitate text entry by way of shapewriting.

Figure 9:
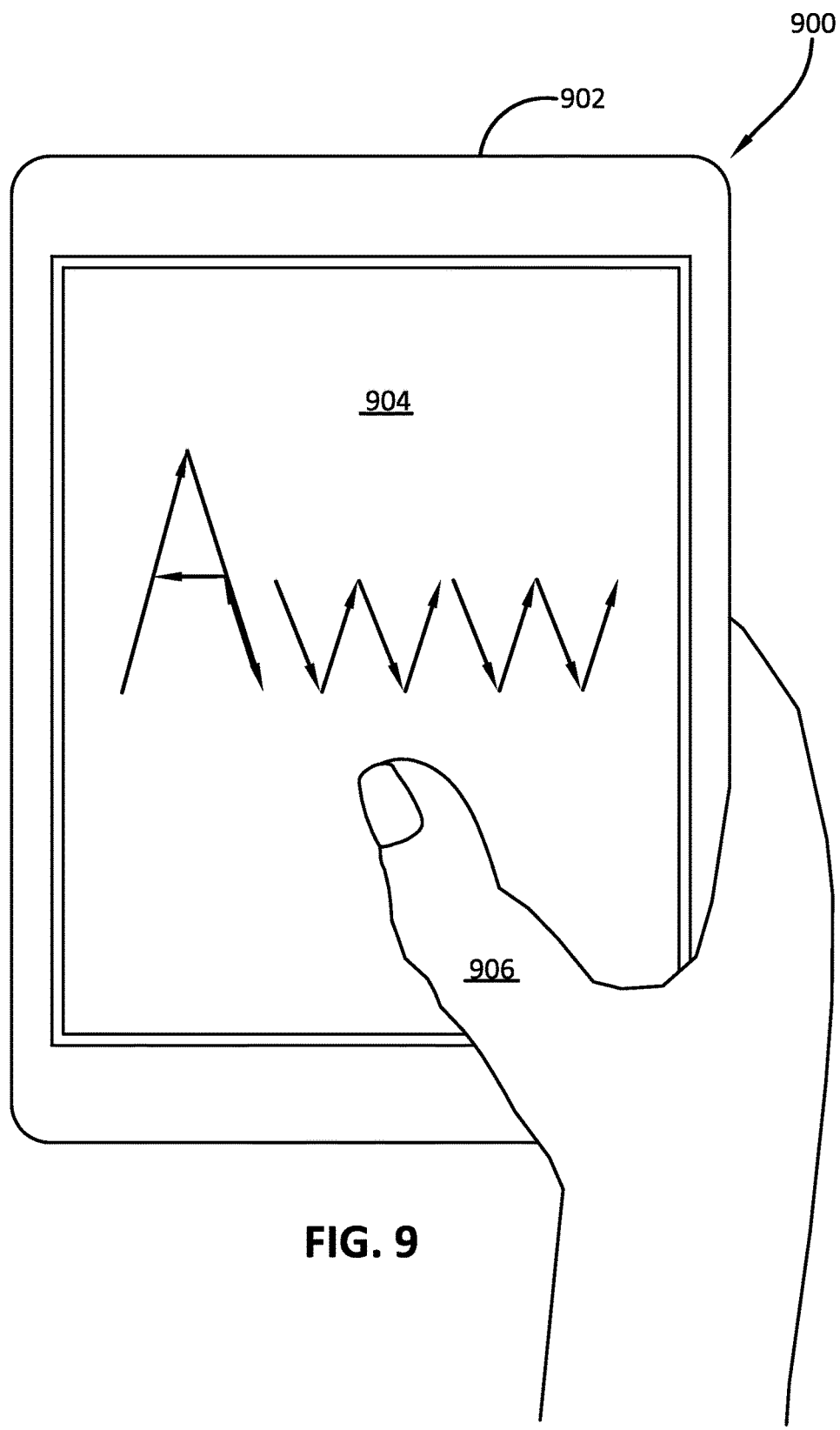
FIG. 9 depicts a mobile computing device configured with handwriting recognition technologies.

Now referring to FIG. 9, an exemplary mobile computing device 900 configured with handwriting recognition functionality is illustrated. The mobile computing device 900 comprises a housing 902, wherein a touch-sensitive display 904 is positioned in an aperture of the housing 902. While not shown, the mobile computing device 900 can be configured with a SIP that facilitates entry of text through utilization of a thumb 906 of a user. In some situations, a dictionary used to output text may not include a particular word that is desirably entered by the user. Accordingly, for example, the user can initiate a handwriting recognition mode in the mobile computing device 900. Such mode can be initiated through a voice command, a particular gesture, or the like. Subsequent to causing the mobile computing device 900 to enter handwriting recognition mode, the user can employ her thumb 906 to handwrite a word that is desirably entered. As shown in FIG. 9, the user may desire to set forth the text "Aww," which may not be in an English dictionary used by the shapewriting model 134. Thus, the user can employ her thumb 906 to handwrite the sequence of characters. As shown, the user employs her thumb 906 to handwrite the letter "A," thereafter handwrite the letter "w," thereafter again handwrite the letter "w." This handwritten sequence of characters can be recognized by the handwriting recognizer component 142, which can translate the handwritten letters to computer readable text which may then be set forth on a display, transmitted to another user, or the like.

While handwriting recognition has been shown with respect to a touch-sensitive display of the mobile computing device 900, it is to be understood that handwriting recognition may be undertaken on a touch-sensitive input panel that is implemented as an accessory, such as positioned on a chair, a steering wheel, or the like. In such an embodiment, rather than performing handwriting on the touch-sensitive display 904, the user can employ her thumb 906 to handwrite characters over the touch-sensitive input panel.

Figure 10:
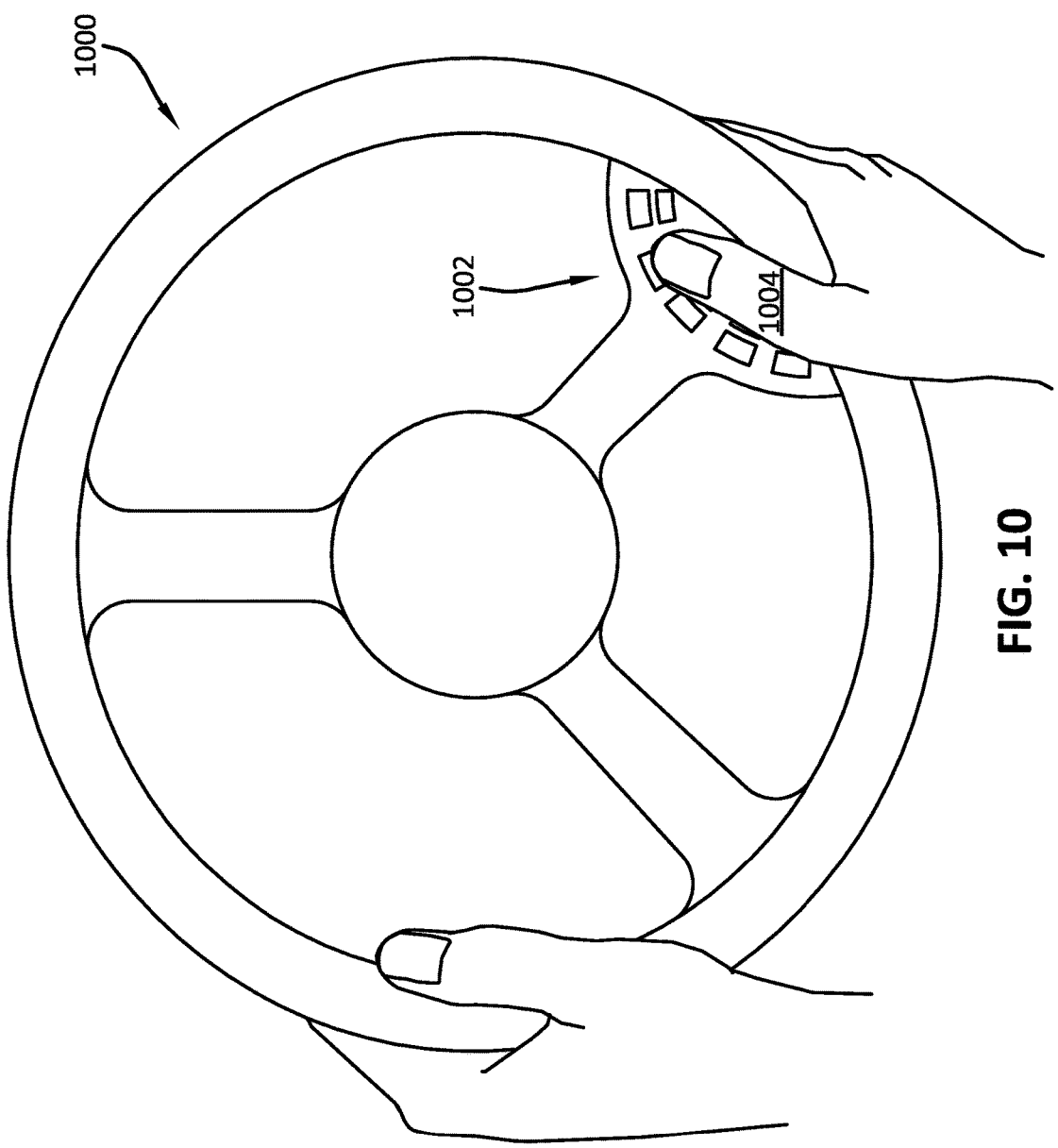
FIG. 10 illustrates a steering wheel that comprises a touch-sensitive input panel for entering text by way of shapewriting.

With reference now to FIG. 10, an exemplary steering wheel 1000 is illustrated. The steering wheel 1000 may be for a vehicle, such as, an automobile, a truck, an all-terrain vehicle, a go-cart, or the like. The steering wheel 1000 comprises a touch sensitive input panel 1002 that can be integral to the steering wheel 1000 or attached thereto as an accessory. In an exemplary embodiment, the touch-sensitive input panel 102 may be a capacitive/conductance-sensing input panel. As described above, the touch-sensitive input panel 1002 may comprise a plurality of keys that are representative of a respective plurality of characters. The touch-sensitive input panel 1002 can be ergonomically arranged to allow the user to employ her thumb 1004 to enter text while holding the steering wheel. Furthermore, as noted above, boundaries between keys may have different textures than the keys themselves, thus providing tactile feedback to the user as to a position of the thumb 1004 on the touch-sensitive input panel 1002. Furthermore, rows of keys may have different elevations, etc.

The touch sensitive input panel 1002 may be in communication with a display, such as a heads-up display in a vehicle, an in-dash display, or the like. In an exemplary embodiment, the touch-sensitive input panel 1002 may be disabled unless it is detected that the vehicle that includes the steering wheel 1000 is stationary. For instance, the touch-sensitive input panel 1002 can be in communication with a speedometer of the vehicle, a GPS sensor of the vehicle, or the like, and can be disabled unless signals output by such sensors indicate that the vehicle is stationary.

Additionally, the touch-sensitive input panel 1002 may be in communication with at least one speaker, such that audio feedback can be provided to the user as the user enters text by way of the thumb 1004 by shapewriting over keys of the touch-sensitive input panel 1002. For instance, if the touch-sensitive input panel 1002 is integral to the steering wheel 1000, the touch-sensitive input panel 1002 may be connected to speakers of the vehicle that includes the steering wheel 1000 by way of a wired connection. In another exemplary embodiment, the touch-sensitive input panel 1002 may be an add-on or accessory to the steering wheel 1000, and the touch-sensitive input panel 1002 may be configured with an antenna or other communications hardware that allows data entered by the user by way of her thumb 1004 to be transmitted wirelessly to a receiver in the vehicle (e.g. through Bluetooth or other suitable communications protocol).

Figure 11:
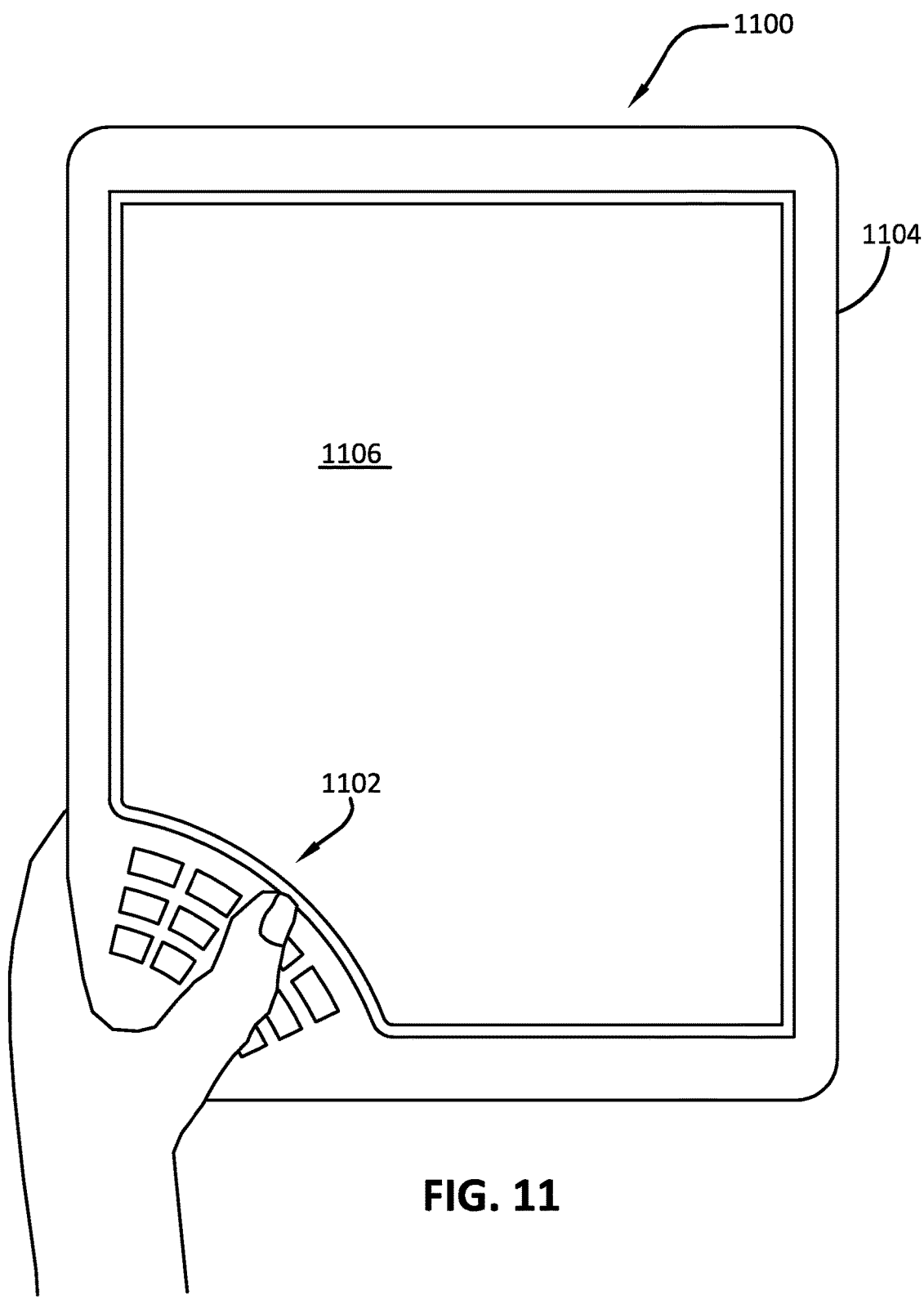
FIG. 11 illustrates an exemplary computing device where a touch-sensitive input panel is integral to a housing of the computing device.

Now referring to FIG. 11, an exemplary mobile computing device 1100 is illustrated. The mobile computing device 1100 comprises a housing 1104, wherein a display 1106 (which may or may not be touch-sensitive) is positioned in an aperture of the housing 1104. A touch-sensitive input panel 1102 is integral to the housing 1104, wherein the touch-sensitive input panel 1102 may be a capacitive sensing or conductive sensing input panel. While shown as being on a front portion of the mobile computing device 1100, it is to be understood that the touch-sensitive input panel 1102 may be positioned on a rear portion of the housing 1104 of the mobile computing device 1100. In such an embodiment, size of the display 1106 is not detrimentally affected by inclusion of the touch-sensitive input panel 1102 in the housing 1104. Furthermore, while the touch-sensitive input panel 1102 is shown as being included on a particular side or corner of the mobile computing device 1100 (the bottom left corner), it is to be understood that the touch-sensitive input panel 1102 may be included on the bottom right corner of the mobile computing device 1100, or on both the bottom left and bottom right corners of the mobile computing device 1100.

If positioned on the rear portion of the housing 1104 of the mobile computing device 1100, the touch-sensitive input panel 1102 can be designed to receive input by way of a finger of the user rather than the thumb. Accordingly, the user can naturally hold the mobile computing device 1100 with one hand and enter text by way of shapewriting with, for instance, her forefinger over the touch-sensitive input panel 1102 positioned on the rear portion of the housing 1104 of the mobile computing device 1100.

Figure 12:
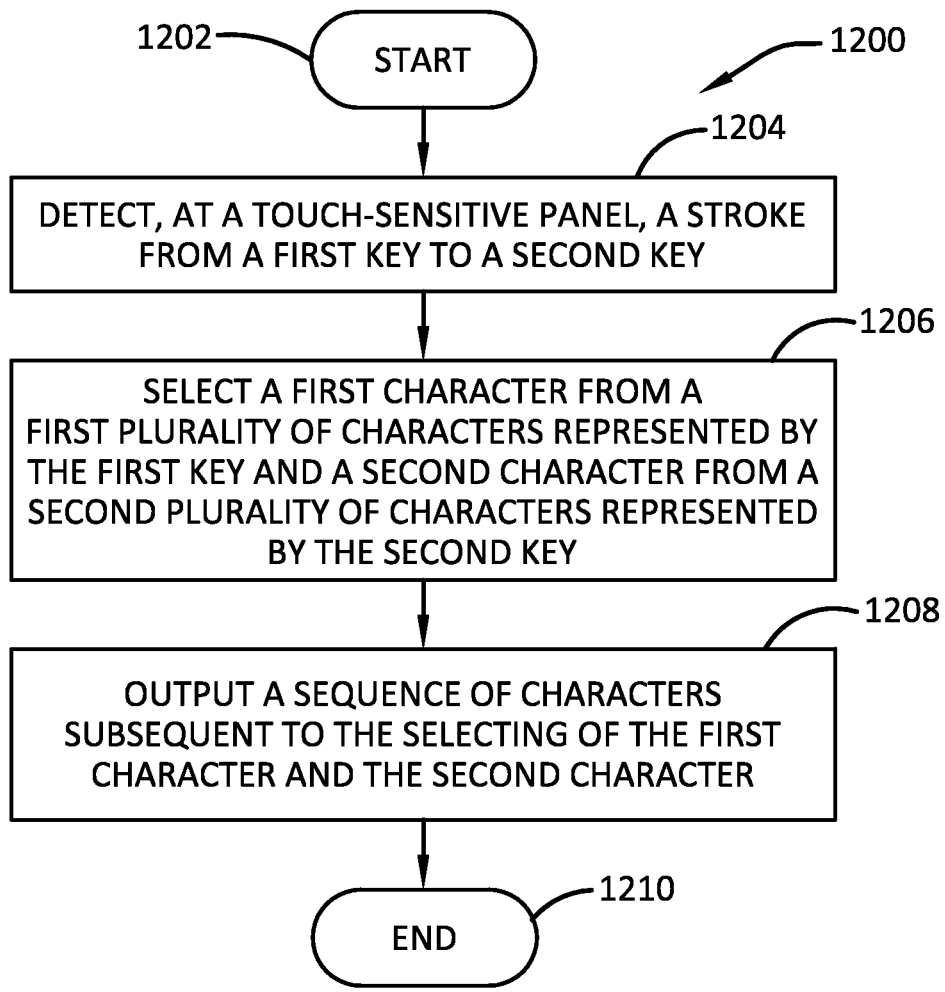
FIG. 12 is a flow diagram that illustrates an exemplary methodology for outputting a sequence of characters responsive to receipt of shapewriting input over a touch-sensitive input panel.
Figure 13:
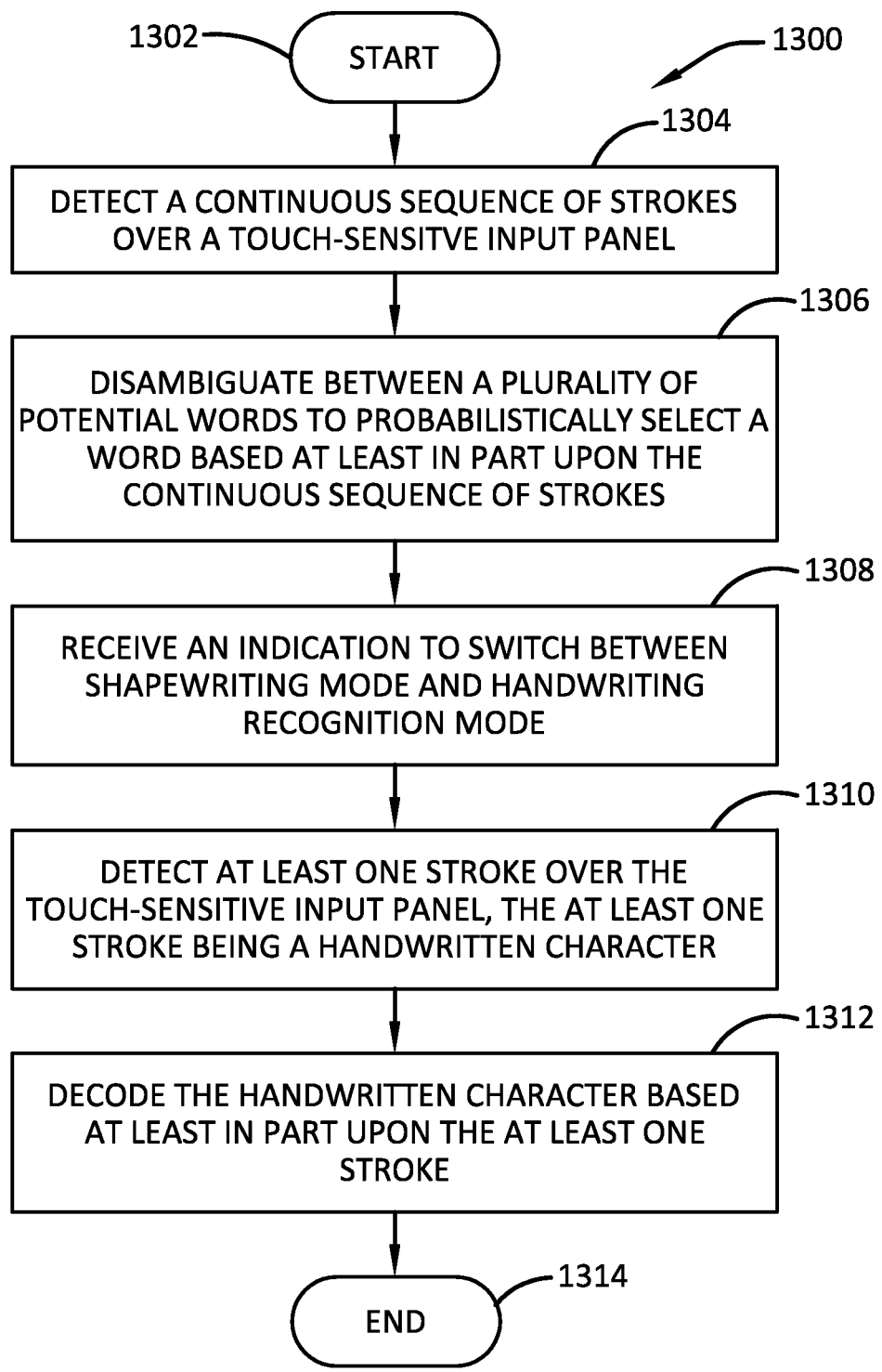
FIG. 13 is a flow diagram that illustrates an exemplary methodology for decoding a handwritten character based at least in part upon a stroke undertaken over a touch-sensitive input panel.
Figure 14:
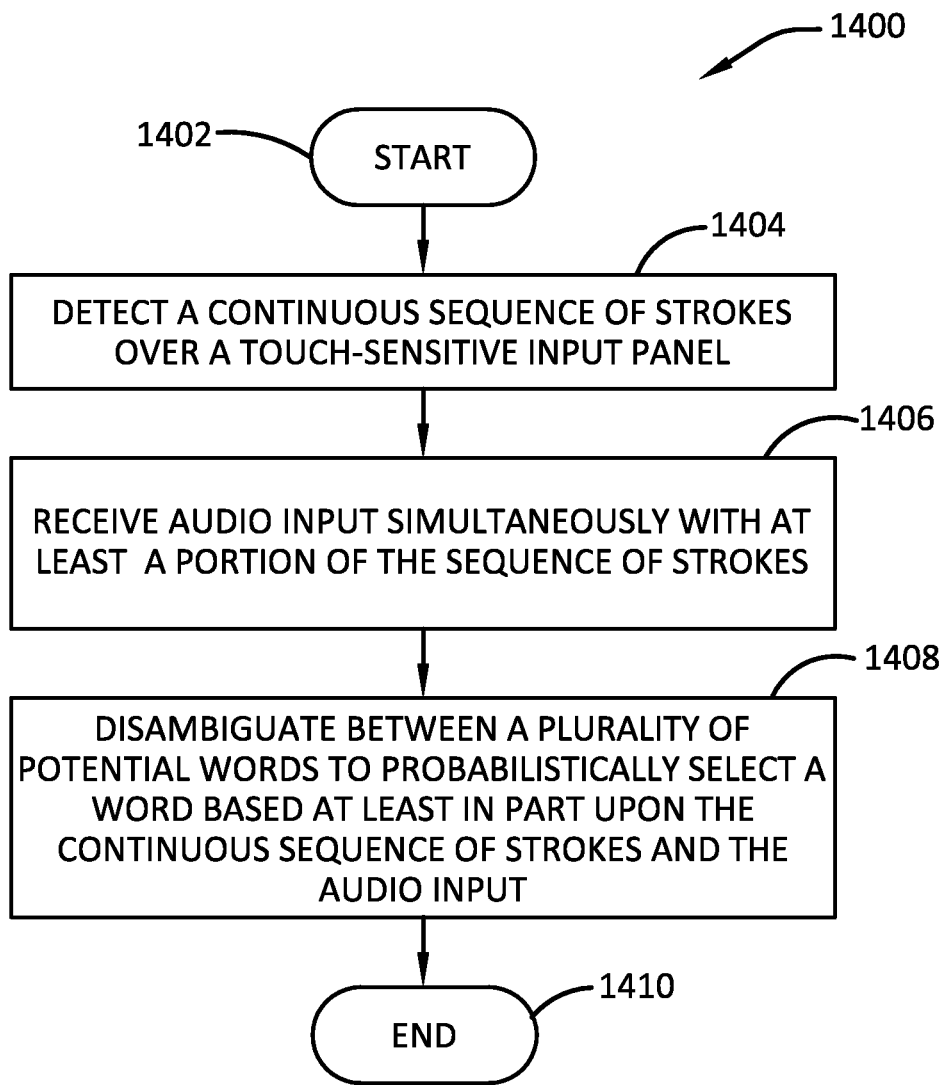
FIG. 14 is a flow diagram that illustrates an exemplary methodology for disambiguating between numerous potential words, wherein the disambiguating is based upon a continuous sequence of strokes set forth over a touch-sensitive input panel by a user.

With reference now to FIGS. 12-14, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like.

With reference now to FIG. 12, an exemplary methodology 1200 that facilitates outputting a sequence of characters in response to selection of a first character and second character utilizing a touch-sensitive input panel is illustrated. The methodology 1200 starts at 1202, and at 1204, on a touch-sensitive input panel, a stroke from a first key to a second key is detected. The touch-sensitive input panel comprises a plurality of keys, wherein each key in the plurality of keys is representative of a respective plurality of characters. Accordingly, the first key is representative of a first plurality of characters and the second key is representative of a second (non-overlapping) plurality of characters. The detected stroke is a continuous transition of a human digit over the touch-sensitive input panel from the first key to the second key. In other words, the user essentially connects the first key and the second key instead of discretely tapping each key.

At 1206, a first character from the first plurality of characters and a second character from the second plurality of characters are selected based upon the detecting of the stroke from the first key to the second key. As noted above, such first character and second character can be selected through utilization of a trained shapewriting model and a language model.

At 1208, a sequence of characters is output in response to the selecting of the first character from the first plurality of characters and the second character from the second plurality of characters. The sequence of characters includes the first character and the second character adjacent to one another, wherein the first character is prior to the second character in the sequence of characters. Generally, the sequence of characters will form a word and the first character and second character can be at least a portion of such word. The methodology 1200 completes at 1210.

Turning now to FIG. 13, an exemplary methodology 1300 for switching between shapewriting and handwriting modes using a touch-sensitive input panel is illustrated. The methodology 1300 starts at 1302, and at 1304 a continuous sequence of strokes is detected over a touch-sensitive input panel. In an exemplary embodiment, the touch-sensitive input panel can comprise a plurality of keys that are arranged in a plurality of rows, such that each row in the plurality of rows includes at least two keys. Further, each key in the plurality of keys is representative of a respective plurality of characters. The continuous sequence of strokes refers to the connecting of multiple keys by the user in the touch-sensitive input panel through employment of a digit of such user, such as, a thumb, while maintaining contact between the thumb and the touch-sensitive input panel.

At 1306, a disambiguation is undertaken between a plurality of potential words to probabilistically select a word based at least in part upon the continuous sequence of strokes detected at 1304. At 1308, an indication is received to switch between shapewriting mode and handwriting recognition mode. Specifically, an indication is received that the touch-sensitive input panel is to recognize handwritten characters set forth by a human digit of the user rather than disambiguating between words based upon shapewriting undertaken by the user.

At 1310, at least one stroke over the touch-sensitive input panel is detected subsequent to receiving the indication at 1308. The at least one stroke detected at 1310 is a handwritten character proffered by the user through contacting the touch-sensitive input panel with her digit. At 1312, the handwritten character is decoded based at least in part upon the least one stroke detected at 1310. The methodology 1300 completes at 1314.

Now referring to FIG. 14, an exemplary methodology 1400 that facilitates disambiguating between potential words based at least in part upon shapewriting undertaken over a touch-sensitive input panel and spoken words of the user is illustrated. The methodology 1400 starts at 1402, and at 1404 a continuous sequence of strokes is detected over a touch-sensitive input panel. For instance, the touch-sensitive input panel can comprise a plurality of keys, wherein each key in the plurality of keys is representative of a respective plurality of characters. In another exemplary embodiment, in accordance with the methodology 1400, each key in the plurality of keys can be representative of a single character.

At 1406, audio input is received from the user simultaneously with at least a portion of the sequence of strokes. For example, the user may set forth the sequence of strokes to indicate her desire to generate a particular word. The user may simultaneously speak such word as she is performing the sequence of strokes over the touch-sensitive input panel. At 1408, a disambiguation is performed between a plurality of potential words to probabilistically select a word based at least in part upon the continuous sequence of strokes detected at 1404 and the audio input received at 1406. The methodology 1400 completes at 1410.

Figure 15:
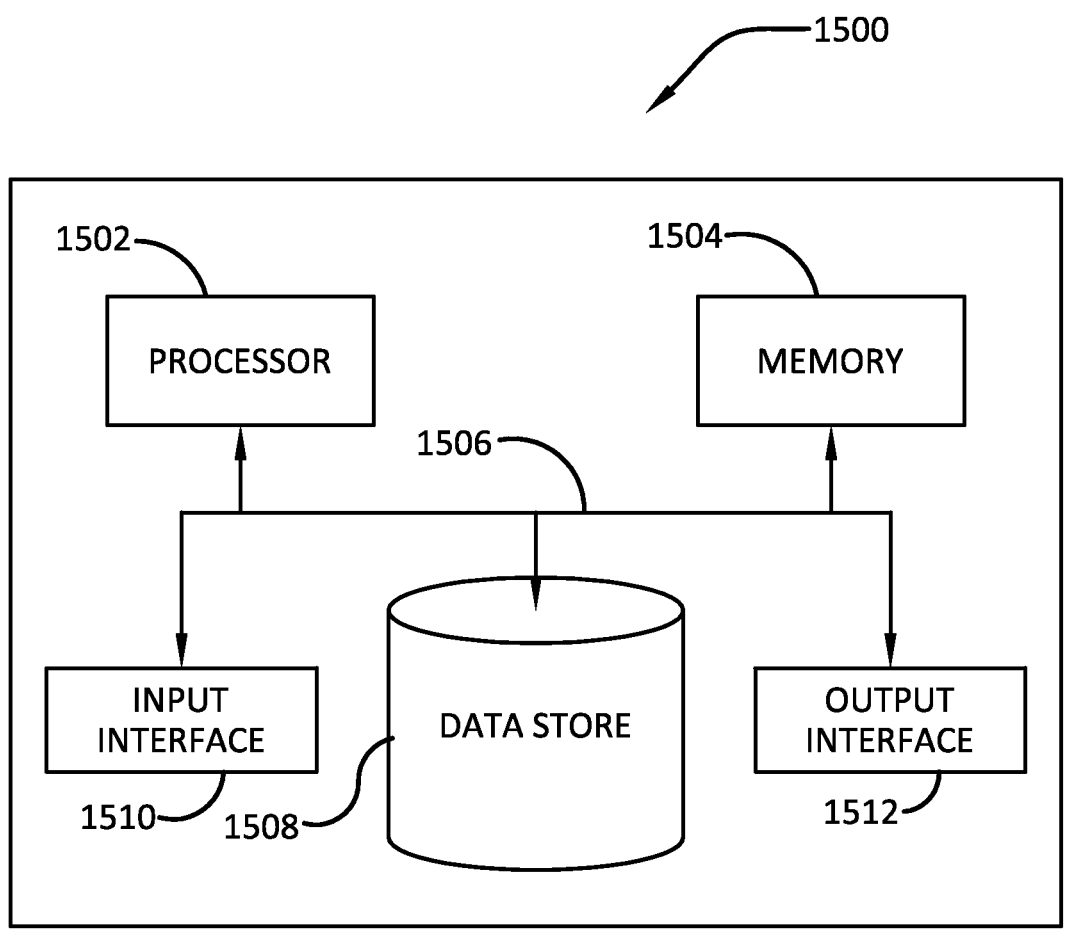
FIG. 15 is an exemplary computing device.

Referring now to FIG. 15, a high-level illustration of an exemplary computing device 1500 that can be used in accordance with the systems and methodologies disclosed herein is illustrated. For instance, the computing device 1500 may be used in a system that supports decoding of text set forth by a user through shapewriting. The computing device 1500 includes at least one processor 1502 that executes instructions that are stored in a memory 1504. The instructions may be, for instance, instructions for implementing functionality described as being carried out by one or more components discussed above or instructions for implementing one or more of the methods described above. The processor 1502 may access the memory 1504 by way of a system bus 1506. In addition to storing executable instructions, the memory 1504 may also store a dictionary, a language model, a shapewriting model, etc.

The computing device 1500 additionally includes a data store 1508 that is accessible by the processor 1502 by way of the system bus 1506. The data store 1508 may include dictionaries, traces, etc. The computing device 1500 also includes an input interface 1510 that allows external devices to communicate with the computing device 1500. For instance, the input interface 1510 may be used to receive instructions from an external computer device, from a user, etc. The computing device 1500 also includes an output interface 1512 that interfaces the computing device 1500 with one or more external devices. For example, the computing device 1500 may display text, images, etc. by way of the output interface 1512.

Additionally, while illustrated as a single system, it is to be understood that the computing device 1500 may be a distributed system. Thus, for instance, several devices may be in communication by way of a network connection and may collectively perform tasks described as being performed by the computing device 1600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method executed by a mobile computing device, the method comprising:
    displaying a touch-sensitive input panel on a touch-sensitive display, the touch-sensitive input panel ergonomically configured to receive input by way of a thumb of a hand that is holding the mobile computing device, the touch-sensitive input panel comprises a plurality of rows of keys that are arced or slanted and angularly offset from edges of the touch-sensitive display, the touch-sensitive input panel bounded by at least two edges of the touch-sensitive display;
    detecting a stroke from a first key in the keys to a second key in the keys, the first key representative of a first plurality of characters and the second key representative of a second plurality of characters, a size of the first key is larger than a size of the second key, and a number of characters represented by the first key is smaller than a number of characters represented by the second key, the stroke being a continuous transition of the thumb over the touch-sensitive input panel from the first key to the second key; and outputting a sequence of characters based upon the detecting of the stroke, the sequence of characters comprising a first character in the first plurality of characters and a second character in the second plurality of characters, the first character being prior to the second character and adjacent to the second character in the sequence of characters.

2. The method of claim 1, further comprising:

detecting a plurality of strokes with respect to a subset of the keys, each stroke being a continuous transition over the touch-sensitive input panel between respective keys in the subset of the keys, each key in the plurality of keys representative of a respective plurality of characters; and disambiguating between potential character sequences corresponding to the plurality of strokes based upon the detecting of the plurality of strokes.

3. The method of claim 2, wherein characters represented across the keys are arranged in accordance with one of the QWERTY standard or alphabetically.

4. The method of claim 1, wherein the outputting of the sequence of characters comprises displaying the sequence of characters on the touch-sensitive display.

5. The method of claim 1, where the sequence of characters is a word, and wherein outputting the sequence of characters comprises causing at least one speaker to audibly output the word.

6. The method of claim 1, further comprising:

detecting, at the touch-sensitive input panel, a plurality of discrete taps on respective keys in the keys, each key in the keys representing a respective character; and outputting a word based upon the detecting of the plurality of discrete taps on the respective keys.

7. The method of claim 1, further comprising:

detecting that, during the stroke, the thumb is positioned over a boundary of the first key; and responsive to detecting that the thumb is positioned over the boundary of the first key, outputting an electrostatic charge to indicate to a user that the thumb is passing over the boundary.

8. The method of claim 1, wherein the sequence of characters is a word, and further comprising:

receiving voice input from a user, the voice input being the word; and in response to receiving the voice input, outputting the word based upon the detecting of the stroke and the voice input from the user.

9. The method of claim 1, further comprising:

receiving an indication that handwriting recognition is to be performed by the mobile computing device;

in response to receiving the indication, detecting at least one stroke over the touch-sensitive input panel, the at least one stroke being indicative of handwriting of a user; and recognizing a character based upon the detecting of the at least one stroke.

10. The method of claim 1, the mobile computing device being a mobile telephone, the method further comprising outputting haptic feedback as the thumb transitions over boundaries between the keys.

11. The method of claim 1, the plurality of rows being arced and concentric with one another, the touch-sensitive input panel bounded by an arced boundary that maps to a radial extent of the thumb when the hand is holding the mobile computing device.

12. A mobile computing device comprising:

a touch-sensitive display that is bounded by a top edge, a bottom edge, a first side edge, and a second side edge, the touch-sensitive display having displayed thereon a touch-sensitive input panel that is ergonomically configured to map to a radial extent of a thumb of a hand that is holding the mobile computing device, the touch-sensitive input panel comprises a plurality of arced rows of keys that are concentric with one another, the touch-sensitive input panel bounded by at least two of the top edge, the bottom edge, the first side edge, or the second side edge, each key in the keys representative of a respective plurality of characters, a first key in the keys is representative of a first number of characters, a second key in the keys is representative of a second number of characters that is greater than the first number of characters, and wherein a size of the first key is larger than a size of the second key;

a processor; and memory that comprises instructions that, when executed by the processor, cause the processor to perform acts comprising:

detecting a sequence of strokes over the touch-sensitive input panel, wherein a stroke is a continuous transition of the thumb over the touch-sensitive input panel between respective keys, and wherein the thumb maintains contact with the touch-sensitive input panel during the sequence of strokes; and decoding a word based upon the sequence of strokes.

13. The mobile computing device of claim 12, the acts further comprise causing the word to be displayed on the touch-sensitive display prior to the sequence of strokes being completed.

14. The mobile computing device of claim 12, further comprising a speaker, wherein the acts further comprise causing the word to be audibly output from the speaker.

15. The mobile computing device of claim 12, further comprising a microphone, the acts further comprise:

receiving audio input by way of the microphone; and decoding the word based upon the sequence of strokes and the audio input received by way of the microphone.

16. The mobile computing device of claim 12 being a mobile telephone or a tablet computing device.

17. The mobile computing device of claim 12, the plurality of keys clustered around a corner of the touch-sensitive display defined by the bottom edge and the right edge.

18. A mobile computing device comprising:

a touch-sensitive display that has a top edge, a bottom edge, a first side edge, and a second side edge;

a processor; and memory configured with instructions that, when executed by a processor, cause the processor to perform acts comprising:

displaying a touch-sensitive input panel on the touch-sensitive display, the touch-sensitive input panel ergonomically designed for text input by way of a thumb of a user that is gripping the mobile computing device with a hand that comprises the thumb, the touch-sensitive input panel comprises a plurality of keys arranged in a plurality of rows, each key in the plurality of keys being representative of a respective plurality of characters, the plurality of rows angularly offset from the top edge, the bottom edge, the first side edge, and the second side edge, the touch-sensitive input panel bounded by at least two of the top edge, the bottom edge, the left side edge, or the right side edge wherein a first key in the plurality of keys is representative of a first number of characters, a second key in the plurality of keys is representative of a second number of characters that is less than the first number of characters, and a size of the second key is larger than a size of the first key;

detecting a sequence of strokes on the touch-sensitive display over the touch-sensitive input panel, a stroke being a continuous transition of the thumb of the user over the touch-sensitive input panel between two keys of the touch-sensitive input panel, and wherein during the sequence of strokes contact is maintained by the thumb of the user with the touch-sensitive display;

disambiguating between a plurality of potential words to probabilistically select a word based upon the detecting of the sequence of strokes on the touch-sensitive display over the touch-sensitive input panel; and displaying the word on the touch-sensitive display in response to disambiguating between the plurality of potential words.

19. The mobile computing device of claim 18, the acts further comprising:

outputting haptic feedback to the thumb to indicate that the thumb is passing over a boundary between keys in the plurality of keys.

20. The computing device of claim 18, wherein disambiguating between the plurality of potential words to probabilistically select the word based comprises using a model that is trained based upon observed sequences of strokes over the touch-sensitive input panel, and further using a language model for a language of the touch-sensitive input panel to disambiguate between the plurality of potential words.

* * * * *